(12) United States Patent
Kumar et al.

(10) Patent No.: US 7,497,922 B2
(45) Date of Patent: Mar. 3, 2009

(54) PLASMA-ASSISTED GAS PRODUCTION

(75) Inventors: Satyendra Kumar, Troy, MI (US); Devendra Kumar, Rochester Hills, MI (US)

(73) Assignee: BTU International, Inc., N. Billerica, MA (US)

( * ) Notice: Subject to any disclaimer, the term of this patent is extended or adjusted under 35 U.S.C. 154(b) by 695 days.

(21) Appl. No.: 10/513,220

(22) PCT Filed: May 7, 2003

(86) PCT No.: PCT/US03/14134

§ 371 (c)(1),
(2), (4) Date: Jun. 29, 2005

(87) PCT Pub. No.: WO03/096369

PCT Pub. Date: Nov. 20, 2003

(65) Prior Publication Data

US 2005/0253529 A1    Nov. 17, 2005

Related U.S. Application Data

(60) Provisional application No. 60/435,278, filed on Dec. 23, 2002, provisional application No. 60/430,677, filed on Dec. 4, 2002, provisional application No. 60/378,693, filed on May 8, 2002.

(51) Int. Cl.
*H05H 1/00* (2006.01)
(52) U.S. Cl. .............................. 156/345.41; 156/345.48
(58) Field of Classification Search ................ 422/186, 422/186.04, 186.29; 156/345.48, 345.41
See application file for complete search history.

(56) References Cited

U.S. PATENT DOCUMENTS

| 3,432,296 | A | 3/1969 | McKinnon et al. |
| 3,612,686 | A | 10/1971 | Braman |
| 3,731,047 | A | 5/1973 | Mullen et al. |
| 4,004,934 | A | 1/1977 | Prochazka |
| 4,025,818 | A | 5/1977 | Giguere |

(Continued)

FOREIGN PATENT DOCUMENTS

DE       222 348 A1    5/1985

(Continued)

OTHER PUBLICATIONS

Agrawal et al., "Grain Growth Control in Microwave Sintering of Ultrafine WC-Co Composite Powder Compacts," Euro PM99, Sintering, Italy, 8 pages (1999).

(Continued)

*Primary Examiner*—David Hung Vu
(74) *Attorney, Agent, or Firm*—Weingarten, Schurgin, Gagnebin & Lebovici LLP

(57) ABSTRACT

Methods and apparatus are provided for plasma-assisted gas production. In one embodiment, a gas, which includes at least one atomic or molecular species, can flow into a cavity (305). The gas can be subjected to electromagnetic radiation having a frequency less than about 333 GHz (optionally in the presence of a plasma catalyst) such that a plasma (310) forms in the cavity (305). A filter (315) capable of passing the atomic or molecular species, but preventing others from passing, can be in fluid communication with the cavity (305). In this way, the selected species can be extracted and collected, for storage or immediate use.

57 Claims, 10 Drawing Sheets

U.S. PATENT DOCUMENTS

| | | |
|---|---|---|
| 4,090,055 A | 5/1978 | King |
| 4,147,911 A | 4/1979 | Nishitani |
| 4,151,034 A | 4/1979 | Yamamoto et al. |
| 4,213,818 A | 7/1980 | Lemons et al. |
| 4,230,448 A | 10/1980 | Ward et al. |
| 4,265,730 A | 5/1981 | Hirose et al. |
| 4,307,277 A | 12/1981 | Maeda |
| 4,339,326 A | 7/1982 | Hirose et al. |
| 4,404,456 A | 9/1983 | Cann |
| 4,473,736 A | 9/1984 | Bloyet et al. |
| 4,479,075 A | 10/1984 | Elliott |
| 4,500,564 A | 2/1985 | Enomoto |
| 4,504,007 A | 3/1985 | Anderson, Jr. |
| 4,609,808 A | 9/1986 | Bloyet et al. |
| 4,611,108 A | 9/1986 | Leprince et al. |
| 4,624,738 A | 11/1986 | Westfall et al. |
| 4,664,937 A | 5/1987 | Ovshinsky et al. |
| 4,666,775 A | 5/1987 | Kim et al. |
| 4,687,560 A | 8/1987 | Tracy |
| 4,698,234 A | 10/1987 | Ovshinsky |
| 4,760,230 A | 7/1988 | Hassler |
| 4,767,902 A | 8/1988 | Palaith |
| 4,772,770 A | 9/1988 | Matsui |
| 4,792,348 A | 12/1988 | Pekarsky |
| 4,840,139 A | 6/1989 | Takei |
| 4,871,581 A | 10/1989 | Yamazaki |
| 4,877,589 A | 10/1989 | O'Hare |
| 4,877,938 A | 10/1989 | Rau et al. |
| 4,883,570 A | 11/1989 | Efthimion et al. |
| 4,888,088 A | 12/1989 | Slomowitz |
| 4,891,488 A | 1/1990 | Davis |
| 4,897,285 A | 1/1990 | Wilhelm |
| 4,908,492 A | 3/1990 | Okamoto et al. |
| 4,919,077 A | 4/1990 | Oda |
| 4,924,061 A | 5/1990 | Labat |
| 4,946,547 A | 8/1990 | Palmour |
| 4,956,590 A | 9/1990 | Phillips |
| 4,963,709 A | 10/1990 | Kimrey |
| 4,972,799 A | 11/1990 | Misumi |
| 5,003,125 A | 3/1991 | Giusti et al. |
| 5,003,152 A | 3/1991 | Matsuo |
| 5,010,220 A | 4/1991 | Apte |
| 5,017,404 A | 5/1991 | Paquet |
| 5,023,056 A | 6/1991 | Aklufi |
| 5,058,527 A | 10/1991 | Ohta et al. |
| 5,072,650 A | 12/1991 | Phillips |
| 5,074,112 A | 12/1991 | Walton |
| 5,085,885 A | 2/1992 | Foley et al. |
| 5,087,272 A | 2/1992 | Nixdorf |
| 5,103,715 A | 4/1992 | Phillips |
| 5,120,567 A | 6/1992 | Frind et al. |
| 5,122,633 A | 6/1992 | Moshammer |
| 5,131,993 A | 7/1992 | Suib et al. |
| 5,164,130 A | 11/1992 | Holcombe |
| 5,202,541 A | 4/1993 | Patterson |
| 5,222,448 A | 6/1993 | Morgenthaler et al. |
| 5,223,308 A | 6/1993 | Doehler |
| 5,224,117 A | 6/1993 | Kruger et al. |
| 5,227,695 A | 7/1993 | Pelletier |
| 5,271,963 A | 12/1993 | Elchman et al. |
| 5,276,297 A | 1/1994 | Nara |
| 5,276,386 A | 1/1994 | Watanabe |
| 5,277,773 A | 1/1994 | Murphy |
| 5,284,544 A | 2/1994 | Mizutani et al. |
| 5,304,766 A | 4/1994 | Baudet et al. |
| 5,307,892 A | 5/1994 | Phillips |
| 5,310,426 A | 5/1994 | Mori |
| 5,311,906 A | 5/1994 | Phillips |
| 5,316,043 A | 5/1994 | Phillips |
| 5,321,223 A | 6/1994 | Kimrey |
| 5,349,154 A | 9/1994 | Harker et al. |
| 5,366,764 A | 11/1994 | Sunthankar |
| 5,370,525 A | 12/1994 | Godon |
| 5,423,180 A | 6/1995 | Nobue et al. |
| 5,435,698 A | 7/1995 | Phillips |
| 5,449,887 A | 9/1995 | Holcombe |
| 5,505,275 A | 4/1996 | Phillips |
| 5,514,217 A | 5/1996 | Niino |
| 5,520,740 A | 5/1996 | Kanai |
| 5,521,360 A | 5/1996 | Johnson et al. |
| 5,523,126 A | 6/1996 | Sano |
| 5,527,391 A | 6/1996 | Echizen et al. |
| 5,536,477 A * | 7/1996 | Cha et al. .................. 422/171 |
| 5,597,456 A | 1/1997 | Maruyama et al. |
| 5,607,509 A | 3/1997 | Schumacher |
| 5,616,373 A | 4/1997 | Karner |
| 5,645,897 A | 7/1997 | Andra |
| 5,651,825 A | 7/1997 | Nakahigashi et al. |
| 5,662,965 A | 9/1997 | Deguchi |
| 5,670,065 A | 9/1997 | Bickmann et al. |
| 5,671,045 A | 9/1997 | Woskov |
| 5,682,745 A | 11/1997 | Phillips |
| 5,689,949 A | 11/1997 | DeFreitas |
| 5,712,000 A | 1/1998 | Wei et al. |
| 5,714,010 A | 2/1998 | Matsuyama et al. |
| 5,715,677 A | 2/1998 | Wallman et al. |
| 5,734,501 A | 3/1998 | Smith |
| 5,735,451 A | 4/1998 | Mori |
| 5,741,364 A | 4/1998 | Kodama |
| 5,755,097 A | 5/1998 | Phillips |
| 5,794,113 A | 8/1998 | Munir et al. |
| 5,796,080 A | 8/1998 | Jennings |
| 5,808,282 A | 9/1998 | Apte |
| 5,828,338 A | 10/1998 | Gerstenberg |
| 5,841,237 A | 11/1998 | Alton |
| 5,847,355 A | 12/1998 | Barmatz et al. |
| 5,848,348 A | 12/1998 | Dennis |
| 5,859,404 A | 1/1999 | Wei |
| 5,868,871 A | 2/1999 | Yokose et al. |
| 5,874,705 A | 2/1999 | Duan |
| 5,904,993 A | 5/1999 | Takeuchi |
| 5,939,026 A | 8/1999 | Seki et al. |
| 5,945,351 A | 8/1999 | Mathuni |
| 5,961,773 A | 10/1999 | Ichimura et al. |
| 5,961,871 A | 10/1999 | Bible et al. |
| 5,973,289 A | 10/1999 | Read et al. |
| 5,976,429 A | 11/1999 | Chen |
| 5,980,843 A | 11/1999 | Silversand |
| 5,980,999 A | 11/1999 | Goto et al. |
| 5,989,477 A | 11/1999 | Berger |
| 5,993,612 A | 11/1999 | Rostaing et al. |
| 5,998,774 A | 12/1999 | Joines et al. |
| 6,011,248 A | 1/2000 | Dennis |
| 6,027,698 A * | 2/2000 | Cha .......................... 422/186 |
| 6,028,393 A | 2/2000 | Izu |
| 6,038,854 A | 3/2000 | Penetrante et al. |
| 6,054,693 A | 4/2000 | Barmatz et al. |
| 6,054,700 A | 4/2000 | Rokhvarger |
| 6,096,389 A | 8/2000 | Kanai |
| 6,101,969 A | 8/2000 | Niori |
| 6,103,068 A | 8/2000 | Merten et al. |
| 6,122,912 A | 9/2000 | Phillips |
| 6,131,386 A | 10/2000 | Trumble |
| 6,132,550 A | 10/2000 | Shiomi |
| 6,149,985 A | 11/2000 | Grace et al. |
| 6,152,254 A | 11/2000 | Phillips |
| 6,153,868 A | 11/2000 | Marzat |
| 6,183,689 B1 | 2/2001 | Roy et al. |
| 6,186,090 B1 | 2/2001 | Dotter |
| 6,189,482 B1 | 2/2001 | Zhao |
| 6,204,606 B1 | 3/2001 | Spence |
| 6,224,836 B1 | 5/2001 | Moisan et al. |
| 6,228,773 B1 | 5/2001 | Cox |
| 6,238,629 B1 | 5/2001 | Barankova et al. |

| | | | | | |
|---|---|---|---|---|---|
| 6,248,206 B1 | 6/2001 | Herchen et al. | JP | 56-140021 A2 | 11/1981 |
| 6,264,812 B1 | 7/2001 | Raaijmakers et al. | JP | 57-119164 A2 | 7/1982 |
| 6,284,202 B1 * | 9/2001 | Cha et al. .................. 422/186 | JP | 58-025073 A | 2/1983 |
| 6,287,980 B1 | 9/2001 | Hanazaki et al. | JP | 59-169053 A | 9/1984 |
| 6,287,988 B1 | 9/2001 | Nagamine et al. | JP | 62-000535 A | 1/1987 |
| 6,297,172 B1 | 10/2001 | Kashiwagi | JP | 04-74858 | 3/1992 |
| 6,297,595 B1 | 10/2001 | Stimson | JP | 06-345541 A | 12/1994 |
| 6,329,628 B1 | 12/2001 | Kuo | JP | 07-153405 A | 6/1995 |
| 6,342,195 B1 | 1/2002 | Roy et al. | JP | 09-235686 A | 2/1996 |
| 6,345,497 B1 | 2/2002 | Penetrante et al. | JP | 08-217558 A | 8/1996 |
| 6,348,158 B1 | 2/2002 | Samukawa | JP | 08-281423 A | 10/1996 |
| 6,358,361 B1 | 3/2002 | Matsumoto | JP | 09-017597 A | 1/1997 |
| 6,362,449 B1 | 3/2002 | Hadidi | JP | 09-023458 A | 1/1997 |
| 6,365,885 B1 | 4/2002 | Roy et al. | JP | 09-027459 A | 1/1997 |
| 6,367,412 B1 | 4/2002 | Ramaswamy et al. | JP | 09-027482 A | 1/1997 |
| 6,370,459 B1 | 4/2002 | Phillips | JP | 09-078240 A | 3/1997 |
| 6,372,304 B1 | 4/2002 | Sano et al. | JP | 09-102400 A | 4/1997 |
| 6,376,027 B1 | 4/2002 | Lee et al. | JP | 09-102488 A | 4/1997 |
| 6,383,333 B1 | 5/2002 | Haino et al. | JP | 09-111461 A | 4/1997 |
| 6,383,576 B1 | 5/2002 | Matsuyama | JP | 09-137274 A | 5/1997 |
| 6,388,225 B1 | 5/2002 | Blum et al. | JP | 09-157048 A | 6/1997 |
| 6,392,350 B1 | 5/2002 | Amano | JP | 09-223596 A | 8/1997 |
| 6,407,359 B1 | 6/2002 | Lagarde et al. | JP | 09-235686 A | 9/1997 |
| 6,413,359 B1 * | 7/2002 | Keller .................. 156/345.48 | JP | 09-251971 A | 9/1997 |
| 6,488,112 B1 | 12/2002 | Kleist | JP | 09-295900 A | 11/1997 |
| 6,512,216 B2 | 1/2003 | Gedevanishvili et al. | JP | 10-066948 A | 3/1998 |
| 6,522,055 B2 | 2/2003 | Uemura et al. | JP | 10-081588 A | 3/1998 |
| 6,575,264 B2 | 6/2003 | Spadafora | JP | 10-081970 A | 3/1998 |
| 6,592,664 B1 | 7/2003 | Frey et al. | JP | 10-087310 A | 4/1998 |
| 6,610,611 B2 | 8/2003 | Liu et al. | JP | 10-204641 A | 8/1998 |
| 6,712,298 B2 | 3/2004 | Kohlberg et al. | JP | 10-259420 A | 9/1998 |
| 6,717,368 B1 | 4/2004 | Sakamoto et al. | JP | 10-294306 A | 11/1998 |
| 6,870,124 B2 | 3/2005 | Kumar et al. | JP | 11-031599 A | 2/1999 |
| 2001/0027023 A1 | 10/2001 | Ishihara et al. | JP | 11-106947 A | 4/1999 |
| 2001/0028919 A1 | 10/2001 | Liu et al. | JP | 11-145116 A | 5/1999 |
| 2002/0034461 A1 | 3/2002 | Segal | JP | 11-186222 A | 7/1999 |
| 2002/0036187 A1 | 3/2002 | Ishll et al. | JP | 11-228290 A | 8/1999 |
| 2002/0124867 A1 | 9/2002 | Kim et al. | JP | 11-265885 A | 9/1999 |
| 2002/0135308 A1 | 9/2002 | Janos et al. | JP | 11-273895 A | 10/1999 |
| 2002/0140381 A1 | 10/2002 | Golkowski et al. | JP | 11-297266 A | 10/1999 |
| 2002/0190061 A1 | 12/2002 | Gerdes et al. | JP | 2000-012526 A | 1/2000 |
| 2002/0197882 A1 | 12/2002 | Niimi et al. | JP | 2000-173989 A | 6/2000 |
| 2003/0071037 A1 | 4/2003 | Sato et al. | JP | 2000-203990 A | 7/2000 |
| 2003/0111334 A1 | 6/2003 | Dodelet et al. | JP | 2000-269182 A | 9/2000 |
| 2003/0111462 A1 | 6/2003 | Sato et al. | JP | 2000-288382 A | 10/2000 |
| 2004/0001295 A1 | 1/2004 | Kumar et al. | JP | 2000-306901 A | 11/2000 |
| 2004/0004062 A1 | 1/2004 | Kumar et al. | JP | 2000-310874 A | 11/2000 |
| 2004/0070347 A1 | 4/2004 | Nishida et al. | JP | 2000-310876 A | 11/2000 |
| 2004/0089631 A1 | 5/2004 | Blalock et al. | JP | 2000-317303 A | 11/2000 |
| 2004/0107796 A1 | 6/2004 | Kumar et al. | JP | 2000-323463 A | 11/2000 |
| 2004/0107896 A1 | 6/2004 | Kumar et al. | JP | 2000-348897 A | 12/2000 |
| 2004/0118816 A1 | 6/2004 | Kumar et al. | JP | 2001-013719 A | 1/2001 |
| | | | JP | 2001-053069 A | 2/2001 |
| FOREIGN PATENT DOCUMENTS | | | JP | 2001-058127 A | 3/2001 |
| | | | JP | 2001-093871 A | 4/2001 |
| DE | 195 42 352 A1 | 5/1997 | JP | 2001-149754 A | 6/2001 |
| DE | 100 05 146 A1 | 8/2001 | JP | 2001-149918 A | 6/2001 |
| EP | 0 228 864 B1 | 7/1987 | JP | 2001-196420 A | 7/2001 |
| EP | 0 335 675 A2 | 10/1989 | JP | 2001-303252 A | 10/2001 |
| EP | 0 435 591 A2 | 12/1990 | JP | 2001-332532 A | 11/2001 |
| EP | 0 436 361 A1 | 12/1990 | JP | 2001-351915 A | 12/2001 |
| EP | 0 228 864 B1 | 3/1991 | JP | 2002-022135 A | 1/2002 |
| EP | 0 420 101 A2 | 4/1991 | JP | 2002-028487 A | 1/2002 |
| EP | 0 435 591 A | 7/1991 | JP | 2002-069643 A | 3/2002 |
| EP | 0 436 361 A1 | 7/1991 | JP | 2002-075960 A | 3/2002 |
| EP | 0 520 719 B1 | 12/1992 | JP | 2002-126502 A | 5/2002 |
| EP | 0 670 666 B1 | 9/1995 | JP | 2002-273161 A | 9/2002 |
| EP | 0 520 719 B1 | 5/1996 | JP | 2002-273168 A | 9/2002 |
| EP | 0 724 720 B1 | 8/1996 | JP | 2003-075070 A | 3/2003 |
| EP | 0 670 666 B1 | 6/1998 | JP | 2003-264057 A | 9/2003 |
| EP | 0 724 720 B1 | 5/2000 | WO | WO 95-11442 A1 | 4/1995 |
| EP | 1 093 846 A1 | 4/2001 | WO | WO 96/06700 A1 | 3/1996 |
| EP | 1 427 265 A2 | 6/2004 | WO | WO 96/38311 A1 | 12/1996 |

| | | |
|---|---|---|
| WO | WO 97-13141 A1 | 4/1997 |
| WO | WO 01-55487 A2 | 8/2001 |
| WO | WO 01-58223 A1 | 8/2001 |
| WO | WO 01-82332 A1 | 11/2001 |
| WO | WO 02-26005 A1 | 3/2002 |
| WO | WO 02-061165 A1 | 8/2002 |
| WO | WO 02-061171 A1 | 8/2002 |
| WO | WO 02-062114 A1 | 8/2002 |
| WO | WO 02-062115 A1 | 8/2002 |
| WO | WO 02-067285 A2 | 8/2002 |
| WO | WO 02-067285 A3 | 8/2002 |
| WO | WO 03-018862 A2 | 3/2003 |
| WO | WO 03-018862 A3 | 3/2003 |
| WO | WO 03-028081 A2 | 4/2003 |
| WO | WO 03-095058 A2 | 11/2003 |
| WO | WO 03-095089 A1 | 11/2003 |
| WO | WO 03-095090 A1 | 11/2003 |
| WO | WO 03-095130 A1 | 11/2003 |
| WO | WO 03-095591 A1 | 11/2003 |
| WO | WO 03-095699 A1 | 11/2003 |
| WO | WO 03-095807 A1 | 11/2003 |
| WO | WO 03-096369 A1 | 11/2003 |
| WO | WO 03-096370 A1 | 11/2003 |
| WO | WO 03-096380 A2 | 11/2003 |
| WO | WO 03-096381 A2 | 11/2003 |
| WO | WO 03-096382 A2 | 11/2003 |
| WO | WO 03-096383 A2 | 11/2003 |
| WO | WO 03-096747 A2 | 11/2003 |
| WO | WO 03-096749 A1 | 11/2003 |
| WO | WO 03-096766 A1 | 11/2003 |
| WO | WO 03-096768 A1 | 11/2003 |
| WO | WO 03-096770 A1 | 11/2003 |
| WO | WO 03-096771 A1 | 11/2003 |
| WO | WO 03-096772 A1 | 11/2003 |
| WO | WO 03-096773 A1 | 11/2003 |
| WO | WO 03-096774 A1 | 11/2003 |
| WO | WO 2004-050939 A2 | 6/2004 |

OTHER PUBLICATIONS

Agrawal et al., "Microwave Sintering of Commercial WC/Co Based Hard Metal Tools," Euro PM99, Sintering, Italy, 8 pages (1999).
Agrawal, D., "Microwave Processing of Ceramics," *Current Opinion in Solid State and Material Science*, 3:480-485 (1998).
Air Liquide, Heat Treatment—Gas Quenching,—http://www.airliquide.com/en/business/industry/_metals/applications/heat_treatment/quenching, 1 page (2000).
Alexander et al., "Electrically Conducive Polymer Nanocomposite Materials," AFRL'l Materials and Manufacturing Directorate, Nonmetallic Materials Division, Polymer Branch, Wright-Patterson AFB OH—http://www.afrlhorizons.com/Briefs/Sept02/ML0206.html, 2 pages (Sep. 2002).
Anklekar et al., Microwave Sintering And Mechanical Properties of PM Copper Steel, pp. 355-362 (2001).
Batanov et al., "Plasmachemical Deposition of Thin Films in a Localized Free-Space Microwave Discharge," *Technical Physics*, 38:6, pp. 475-479 (1993).
Cheng et al., "Microwave Processing of WC-Co Composites And Ferroic Titanates" (Original Article), *Mat Res Innovat* (1):44-52 (1997).
Cheng, J., "Fabricating Transparent Ceramics by Microwave Sintering," *Focus on Electronics*, 79:9, pp. 71-74 (2000).
Collin, *Foundations for Microwave Engineering*, 2d Ed., IEEE Press, NY, pp. 180-192 (2001).
Egashira,. "Decomposition of Trichloroethylene by Microwave-induced Plasma Generated from SiC whiskers," *J. Electrochem. Soc.*, 145:1, pp. 229-235 (Jan. 1998).
Ford 1.3L Catalytic Converter (1988-1989)—http://catalyticconverters.com/FO13L43778889.html, 1 page.
Ford Contour Catalytic Converter (1995-1996)—http://www.all-catalytic-converters.com/ford-contour-converter.html, 2 pages.
Fraunhofer ILT, "Plasma-Reactors for Aftertreatment of Automobile Exhause Gas," Fraunhofer-Gesellschaft (2002)—http://www.ilt.fhg.de/eng/jb01-s35.html, 1 page.
French, "The Plasma Waste Converter—From Waste Disposal to Energy Creation,"—http://www.arofe.army.mil/Conferences/CWC2001/French.htm, p. 1.
Gao et al., "Superfast Densification of Oxide/Oxide Ceramic Composites," *J. Am. Ceram. Soc.* 82[4]1061-63 (1999)—http://216.239.39.100/search?q=cache:b-TFhQInU6YC:www.umr.edu/~hruiz/GaoShen.ppt+spark+plasma.
Gedevanishvili et al., "Microwave Combustion Synthesis And Sintering of Intermetallics And Alloys," *Journal of Materials Science Letters*, (18), pp. 665-668 (1999).
General Eastern, Semiconductor Manufacturing—Using the HygroTwin 2850 to Reduce Costs, Improve Quality, TIM 003, 3 pages, (1997).
George, S.J., "The Catalytic Coverter," 5 pages, (2002)—http://krioma.net/Articles/Catalytic%20Converter/Catalytic%20Converter.html.
GlassTesseract.Org—The Home of Kenz Benz, "Tech Procedures and Tips: Exhaust Manifolds and Catalytic Coverters Removal—and Installation", 4 pages (2003)—http://glasstesseract.org/tech/catalytic.html.
Holt Walton & Hill, Powder Metallurgy—Overview of the Powder Metallurgy Process, Azom.com, 3 pages (2002)—http://www.azom.com/details.asp?ArticleID=1414.
Honda Automobile News Press Release, "Honda Introduces Its First Two Clean Air Vehicles, the Civic Ferio LEV and Partners 1.6 LEV", 3 pages (Feb. 1997)—http://world.honda.com/news/1997/4970217a.html.
Honda Civic CX Catalytic Converter, 1 page (1996-2000)—http://www.catalyticconverters.com/HOCIVICCX4349600.html.
Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).
Hydrogen Separation Membrane,—Advanced Gas Separation: H2 Separation, 1 page (2001).
Kalyanaraman et al., "Synthesis and Consolidation of Iron Nanopowders," *NanoStructured Materilas*, vol. 10, No. 8, pp. 1379-1392 (1998).
Karger, Odo—Area of Work: Microwave Welding, 2 pages (Nov. 2002).
Kong et al., "Nuclear-Energy-Assisted Plasma Technology for Producing Hydrogen," Nuclear Energy Research Initiative, 4 pages (2002).
Lewis, R. J. Sr., "Hawley's Condensed Chemical Dictionary," 12th ed., p. 230-232 (1993).
Microelectronics Plasma Applications,—March Plasma Systems, 2 pages (2002)—http://www.marchplasma.com/micro_app.htm.
Microwave Welding of Plastics, TWI World Centre for Materials Joining Technology, 2 pages, (Aug. 2002)—http://www.twi.co.uk/j32k/protected/band_3/ksab001.htm.
Microwave Welding, Welding and Joining Information Network, 3 pages (Nov. 2002)—http://www.ewi.org/technologies/plastics/microwave.asp.
Office of Energy Efficiency, "Using Non-Thermal Plasma Reactor to Reduce NOx Emissions from CIDI Engines," 1 page (Apr. 1999).
Optoelectronic Packaging Applications, March Plasma Systems, 2 pages (2002)—http://www.marchplasma.com/opto_app.htm.
Peelamedu et al., "Anisothermal Reaction Synthesis of Garnets, Ferrites, And Spinels In Microwave Field," *Materials Research Bulletin* (36):2723-2739 (2001).
PerfectH2TM PE8000 Series, "Palladium Diffusion Hydrogen Purifier For High Flow Rate MOCVD Applications" Matheson Tri.Gas, 2 pages (2002).
Photonics Dictionary, "Definition for Word(s): Thyratron" (Laurin Publishing), 2 pages, (1996-2003)—http://www.photonics.com/dictionary/lookup/lookup.asp?url=lookup&entrynum=538.
Plasma Applications, Coalition for Plasma Science, 2 pages (1999, 2000)—http://www.plasmacoalition.org/applications.htm.

Plasma Electronics, Classical Plasma Applications, 2 pages (2002)—http://www.plasma.iinpe.br/English/Classical_Applications.htm.

Plasma-Assisted Catalyst Systems, Novel Plasma Catalysts Significantly Reduce NOx from Diesel Engines, 2 pages (Apr. 2001)—http://www.ott.doe.gov/success.html (2 pages).

Printed Circuit Board (PCB) Plasma Applications, March Plasma Systems, 2 pages (2002)—http://www.marchplasma.com/pcb_app.01.htm.

Roy et al., "Full Sintering of Powdered-Metal Bodies In A Microwave Field," *Nature*, vol. 399, pp. 668-670 (Jun. 17, 1999).

Roy et al., "Microwave Processing: Triumph of Applications-Driven Science in WC-Composites And Ferroic Titanates," *Ceramic Transactions*, vol. 80, pp. 3-26, (1997).

Roy et al., "Definitive Experimental Evidence for Microwave Effects: Radically New Effects of Separated E and H Fields, Such As Decrystallization of Oxides in Seconds," *Materials Research Innovations*, Springer-Verlag, vol. 6, No. 3, pp. 129-140 (2002).

Roy et al., "Major phase transformations and magnetic property changescaused by electromagnetic fields at microwave frequencies," *Journal Of Material Research*, 17:12, pp. 3008-3011 (2002).

Samant et al., "Glow Discharge Nitriding Al 6063 Samples and Study of Their Surface Hardness," Metallofizika I Noveishe Takhnologii, 23(3), pp. 325-333 (2001).

Sato et al., Surface Modification of Pure Iron by RF Plasma Nitriding with DC Bias Voltage Impression, *Hyomen Gijutsu* 48(3), pp. 317-323 (1997) (English Abstract).

Saveliev Y. "Effect of Cathode End Caps and a Cathode Emissive Surface on Relativistic Magnetroc Operation," *IEEE Transactions on Plasma Science*, 28:3, pp. 478-484 (Jun. 2000).

SC/Tetra Engine Manifold Application, 2 pages (2001)—http://www.sctetra.com/applications/01_manifold.htm.

Shulman et al., "Microwaves In High-Temperature Processes," GrafTech, 8 pages (Mar. 2003) http://www.industrialheating.com/CDA/ArticleInformation/features/BNP_Features_Item/0,2832,94035,00.html.

Slone et al., "Nox Reduction For Lean Exhaust Using Plasma Assisted Catalysis," NoxTech Inc., 5 pages (2000)—http://www.osti.gov/fcvt/deer2000/bhattpa.pdf.

Sumitomo Heavy Industries, Ltd., "Spark Plasma Sintering—What is Spark Plasma Sintering," 3 pages (2001)—http://www.shi.co.jp/sps/eng/.

Takizawa et al. "Synthesis of inorganic materials by 28 GHz MW radiation," Proceed. Of The Symposium On Mw Effects And Applications, Aug. 2, 2001, Kokushikau Univ., Tokyo, Japan, pp. 52-53, (2001).

Taube et al. "Advances in Design of Microwave Resonance Plasma Source," American Institute of Chemical Engineering, 2004 Annual Meeting, Presentation (Nov. 2004).

Uchikawa et al., "New Technique of Activating Palladium Surface for Absorption of Hydrogen or Deuterium," *Japanese Journal of Applied Physics*, vol. 32 (1993), pp. 5095-5096, Part 1, No. 11A (Nov. 1993).

Wang et al., "Densification of Al2O3 Powder Using Spark Plasma Sintering," *J. Mater. Res.*, 15:4, pp. 982-987 (Apr. 2000).

Way et al., "Palladium/Copper Allow Composite Membranes for High Temperature Hydrogen Separation from Coal-Derived Gas Streams," Dept. of Chemical Engineering, Colorado School of Mines, 3 pages (1999).

Welding Breakthrough: Generating and Handling a Microwave Powered Plasma, Australian Industry News, Information & Suppliers, 7 pages (Sep. 2001)—http://www.industry/search.com.au/features/microwave.asp.

Welding Plastic Parts, Business New Publishing Company, 4 pages (Nov. 2002)—http://www.assemblymag.com/Common/print_article.asp?rID=E455512C17534C31B96D.

Xie et al., "Effect of Rare Earth in Steel on Thermochemical Treatment," Xiuou Jinshu Cailiao Yu Gongcheng, 26(1), pp. 52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jun. 26, 2003, in PCT/US03/14037.

International Search Report issued on Jul. 8, 2003, in PCT/US03/14124.

International Search Report issued on Jun. 24, 2003, in PCT/US03/14132.

International Search Report issued on Jul. 29, 2003, in PCT/US03/14052.

International Search Report issued on Jul. 29, 2003, in PCT/US03/14054.

International Search Report issued on Apr. 27, 2004, in PCT/US03/14036.

International Search Report issued on Aug. 21, 2003, in PCT/US03/14053.

International Search Report issued on Feb. 8, 2004, in PCT/US03/14034.

International Search Report issued on Aug. 29, 2003, in PCT/US03/14039.

International Search Report issued on Aug. 21, 2003, in PCT/US03/14038.

International Search Report issued on Aug. 24, 2003, in PCT/US03/14133.

International Search Report issued on Jul. 28, 2003, in PCT/US03/14035.

International Search Report issued on Jun. 27, 2003, in PCT/US03/14040.

International Search Report issued on Jul. 17, 2003, in PCT/US03/14134.

International Search Report issued on Jun. 27, 2003, in PCT/US03/14122.

International Search Report issued on Jun. 24, 2003, in PCT/US03/14130.

International Search Report issued on Apr. 30, 2004, in PCT/US03/14055.

International Search Report issued on Apr. 30, 2004, in PCT/US03/140137.

International Search Report issued on Aug. 21, 2003, in PCT/US03/14123.

International Search Report issued on Jul. 29, 2003, in PCT/US03/14121.

International Search Report issued on Aug. 24, 2003, in PCT/US03/14136.

International Search Report issued on May 3, 2004, in PCT/US03/14135.

Written Opinion issued on Apr. 13, 2004, in PCT/US03/014037.
Examination Report issued on Feb. 24, 2004, in PCT/US03/14054.
Written Opinion issued on Dec. 22, 2003, in PCT/US03/14053.
Examination Report issued on Apr. 26, 2004, in PCT/US03/14053.
Written Opinion issued on Dec. 22, 2003, in PCT/US03/14123.
Examination Report issued on Apr. 26, 2004, in PCT/US03/14123.
Quayle Action issued on Apr. 19, 2005, in U.S. Appl. No. 10/449,600.
Quayle Action issued on Apr. 19, 2004, in U.S. Appl. No. 10/430,414.
Office Action issued on May 18, 2004, in U.S. Appl. No. 10/430,426.
Reply to Office Action filed on Nov. 18, 2004, in U.S. Appl. No. 10/430,426.
Office Action issued on Feb. 24, 2005, in U.S. Appl. No. 10/430,426.
Accentus Corporate Overview, 3 pages—http://www.accentus.co.uk/ipco/html/techenv6_txt_fr.html (2003).

Agrawal et al., "Grain Growth Control in Microwave Sintering of Ultrafine WC-Co Composite Powder Compacts," Euro PM99 Conference, Sintering, Turino, Italy, 8 pages (1999).

Agrawal, "Metal Parts from Microwaves," *Materials World* 7(11):672-673 (1999).

Agrawal et al., "Microwave Sintering of Commercial WC/Co Based Hard Metal Tools," Euro PM99 Conference, Sintering, Turino, Italy, 8 pages (1999).

Agrawal, "Microwave Processing of Ceramics," *Current Opinion in Solid State and Materials Science* 3:480-485 (Oct. 1998).

Air Liquide, "Heat Treatment—Gas Quenching,"—http://www.airliquide.com/en/business/industry/metals/applications/heat_treatment/quenching.asp, 1 page (2000).

Alexander et al., "Electrically Conductive Polymer Nanocomposite Materials," AFRL's Materials and Manufacturing Directorate, Nonmetallic Materials Division, Polymer Branch, Wright-Patterson AFB OH—http://www.afrlhorizons.com/Briefs/Sept02/ML0206.html, 2 pages (Sep. 2002).
Al-Shamma'a et al., "Microwave Atmospheric Plasma for Cleaning Exhaust Gases and Particulates," Future Car Congress, Washington, Jun. 3-5, 2002 (1 page).
Alton et al., "A High-Density, RF Plasma-Sputter Negative Ion Source," The 8th Intl. Conf. on Heavy-Ion Accelerator Technology, Argonne Natl. Lab., Oct. 5-9, 1998, Poster Presentation (3 pages).
Anklekar et al., "Microwave Sintering and Mechanical Properties of PM Copper Steel," *Powder Metallurgy* 44(4):355-362 (2001).
Batanov et al., "Plasmachemical Deposition of Thin Films in a Localized Free-Space Microwave Discharge," *Technical Physics* 38(6):475-479 (Jun. 1993).
Cheng, J., "Fabricating Transparent Ceramics by Microwave Sintering," *Am. Ceramic Soc. Bull.* 79(9):71-74 (2000).
Cheng et al., "Microwave Processing of WC-Co Composites And Ferroic Titanates" *Mat. Res. Innovat.* 1(1):44-52 (Jun. 1997).
"Classification of Cast Iron"—Key to Steel—Article—http://www.key-to-steel.com/Articles/Art63.htm, 3 pages (1999).
Collin, in: *Foundations for Microwave Engineering*, 2d Ed., IEEE Press, NY, pp. 180-192 (2001).
"Controlled Atmospheres Sinter-Hardening,," Sarnes Ingenieure, 2 pages, http://www.space-ctrl.de/de/2002/06/399.php (2002).
Egashira et al., "Decomposition of Trichloroethylene by Microwave-Induced Plasma Generated from SiC Whiskers," *J. Electrochem. Soc*., 145(1):229-235 (Jan. 1998).
Ford 1.3L Catalytic Converter (1988-1989) product description—http://catalyticconverters.com/FO13L43778889.html, 1 page, Undated.
Ford Contour Catalytic Converter (1995-1996) product description—http://www.all-catalytic-converters.com/ford-contour-converter.html, 2 pages, Undated.
Fraunhofer ILT, "Plasma-Reactors for Aftertreatment of Automobile Exhaust Gas," Fraunhofer-Gesellschaft—http://www.ilt.fhg.de/eng/jb01-s35.html, 1 page (2002).
French, "The Plasma Waste Converter—From Waste Disposal to Energy Creation," The International Chemical Weapons Demilitarization Conference, Gifu City, Japan (May 22-24, 2001)—http://www.arofe.army.mil/Conferences/CWC2001/French.htm, 1 page.
Gao et al., "Superfast Densification of Oxide/Oxide Ceramic Composites," *J. Am. Ceram. Soc.* 82(4)1061-1063 (1999).
Gedevanishvili et al., "Microwave Combustion Synthesis And Sintering of Intermetallics and Alloys," *J. Mat. Sci. Lett.* 18(9):665-668 (1999).
General Eastern, "Semiconductor Manufacturing—Using the HygroTwin 2850 to Reduce Costs, Improve Quality,", 3 pages, www.generaleastern.net (1997).
George, "The Catalytic Converter," 5 pages, (2002)—http://krioma.net/articles/Catalytic%20Converter/Catalytic%20Converter.htm.
GlassTesseract.Org website, "Tech Procedures and Tips: Exhaust Manifolds and Catalytic Converters Removal—and Installation", 4 pages (2003). http://glasstesseract.org/tech/catalytic.html.
*Hackh's Chemical Dictionary*, 3rd edition, J. Grant, Ed., McGraw-Hill Book Co., NY, pp. 174-175 (1944).
"Heat Treatment of Steels—The Processes," AZoM.com, 9 pages, (2002)—www.azom.com.
"Powder Metallurgy—Overview of the Powder Metallurgy Process," AZoM.com, 3 pages (2002)—http://www.azom.com/details.asp?ArticleID=1414.
Honda Automobile News Press Release, "Honda Introduces Its First Two Clean Air Vehicles, the Civic Ferio LEV and Partner 1.6 LEV," 3 pages (Feb. 1997)—http://world.honda.com/news/1997/4970217a.html.
Honda Civic CX Catalytic Converter, (1996-2000) 1 page—http://www.catalyticconverters.com/HOCIVICCX4349600.html, Undated.
Hsu et al., "Palladium-Coated Kieselguhr for Simultaneous Separation and Storage of Hydrogen," Westinghouse Savannah River Company, U.S. Dept. of Commerce, National Technical Information Service, 14 pages (2001).
Fincke, "Hydrogen Separation Membrane,—Advanced Gas Separation: H2 Separation," Summary of research proposal, 1 page (2003).

Saville, in: *Iron and Steel*, Chapter 6, pp. 16-22, Wayland Publ., England (1976)..
Kalyanaraman et al., "Synthesis and Consolidation of Iron Nanopowders," *NanoStructured Materials* 10(8):1379-1392 (1998).
Karger, Scientific Staff Research Areas for KTP Company, 2 pages (Nov. 2002)—http://wwwfb10.upd.de/KTP/KTP-ENG/Staff/Karger/body_karger.html.
Kong et al., "Nuclear-Energy-Assisted Plasma Technology for Producing Hydrogen," Nuclear Energy Research Initiative Research Proposal, 4 pages (2002).
Lewis, in: *Hawley's Condensed Chemical Dictionary*, 12th ed., pp. 230-232, Van Nostrand Reinhold, NY (1993).
March Plasma Systems, product descriptions,2 pages (2002)—http://www.marchplasma.com/micro_app.htm, Undated.
Ahmed et al., "Microwave Joining of Alumina and Zirconia Ceramics," IRIS Research Topics 1998, 1 page (1988).
"Microwave Welding," EWi WeldNet, 1 page—(2003) http://www.ferris.edu/cot/accounts/plastics/ htdocs/Prey/Microwave%20Homepage.htm.
"Microwave Welding of Plastics," TWI World Centre for Materials Joining Technology, 2 pages, (Aug. 2002)—http://www.twi.co.uk/j32k/protected/band_3/ksab001.htm.
"Microwave Welding," Welding and Joining Information Network, 3 pages (Nov. 2002)—http://www.ewi.org/technologies/plastics/microwave.asp.
Thomas et al., "Non-Thermal Plasma Aftertreatment of Particulates—Theoretical Limits and Impact on Reactor Design," SAE Spring Fuels and Lubes Conference, Paris, France, 27 pages—Jun. 19-22, 2000—http://www.aeat.co.uk/electrocat/sae/saepaper.htm.
"Using Non-Thermal Plasma Reactor to Reduce NOx Emissions from CIDI Engines," Office of Energy Efficiency and Renewable Energy, Office of Transportation, 1 page (Apr. 1999).
"Optoelectronic Packaging Applications," March Plasma Systems, Product Description, 2 pages (2002)—http://www.marchplasma.com/opto_app.htm.
Paglieri et al., "Palladium Alloy Composite Membranes for Hydrogen Separation," 15th Annual Conf. Fossil Energy Matter, Knoxville, TN (2001), 5 pages.
Peelamedu et al., "Anisothermal Reaction Synthesis of Garnets, Ferrites, and Spinels In Microwave Field," *Materials Research Bulletin* 36:2723-2739 (Dec. 2001).
PerfectH2 PE8000 Series Product Description, Palladium Diffusion Hydrogen Purifier For High Flow Rate MOCVD Applications, Matheson Tri.Gas, 2 pages (2002).
"Plasma Applications," Coalition for Plasma Science, 2 pages (1999, 2000)—http://www.plasmacoalition.org/applications.htm.
"Classical Plasma Applications," 2 pages (2002)—http://www.plasma.iinpe.br/English/Classical_Applications.htm.
"Novel Plasma Catalysts Significantly Reduce NOx from Diesel Engines," US Department of Energy research summary, 2 pages (Apr. 2001)—http://www.ott.doe.gov/success.html.
"Printed Circuit Board (PCB) Plasma Applications," March Plasma Systems product descriptions, 2 pages (2002)—http://www.marchplasma.com/pcb_app.01.htm.
Roy et al., "Definitive Experimental Evidence for Microwave Effects: Radically New Effects of Separated E and H Fields, Such As Decrystallization of Oxides in Seconds," *Materials Research Innovations* 6(3):129-140 (2002).
Roy et al., "Full Sintering of Powdered-Metal Bodies In A Microwave Field," *Nature* 399:668-670 (Jun. 17, 1999).
Roy et al., "Major phase transformations and magnetic property changes caused by electromagnetic fields at microwave frequencies," *J. Mat. Res.* 17(12):3008-3011 (2002).
Roy et al., "Microwave Processing: Triumph of Applications-Driven Science in WC-Composites And Ferroic Titanates," *Ceramic Transactions* 80:3-26, (1997).
Samant et al., "Glow Discharge Plasma Nitriding of AI 6063 Samples and Study of Their Surface Hardness," *Metallofiz. Noveishe Tekhnol.* 23(3):325-333 (2001).
Sato et al., "Surface Modification of Pure Iron by rf Plasma Nitriding with dc Bias Voltage Impression," *Hyomen Gijutsu* 48(3):317-323 (1997) (English Abstract).

Saveliev et al., "Effect of Cathode End Caps and a Cathode Emissive Surface on Relativistic Magnetron Operation," *IEEE Transactions on Plasma Science* 28:478-484 (Jun. 2000).

SC/Tetra Engine Manifold Application, 2 pages (2001)—http://www.sctetra.com/applications/01_manifold.htm.

Shulman, "Microwaves In High-Temperature Processes," GrafTech Intl. Ltd., 8 pages (Mar. 2003) http://www.industrialheating.com/CDA/ArticleInformation/features/BNP_Features_Item/0,2839,94035,00.html.

Slone et al., "NOx Reduction For Lean Exhaust Using Plasma Assisted Catalysis," NOXTECH Inc., 5 pages (2000)—http://www.osti.gov/fcvt/deer2000/bhattpa.pdf.

Sumitomo Heavy Industries, Ltd., "Spark Plasma Sintering," 3 pages (2001)—http://www.shi.co.jp/sps/eng/.

Takizawa et al. "Synthesis of inorganic materials by 28 GHz Microwave Irradiation," *Transactions of the Materials Research Society of Japan* 27(1):51-54 (2002).

Taube et al., "Advances in Design of Microwave Resonance Plasma Source," American Institute of Chemical Engineering, 2004 Annual Meeting, Presentation (Nov. 2004).

Uchikawa et al., "New Technique of Activating Palladium Surface for Absorption of Hydrogen or Deuterium," *Japanese J. Appl. Phys.* 32:5095-5096, Part 1, No. 11A (Nov. 1993).

Wang et al., "Densification of $Al_2O_3$ Powder Using Spark Plasma Sintering," *J. Mater. Res.*, 15(4):982-987 (Apr. 2000).

Way et al., "Palladium/Copper Alloy Composite Membranes for High Temperature Hydrogen Separation from Coal-Derived Gas Streams," Research Grant Report, Dept. of Chemical Engineering, Colorado School of Mines, 3 pages (1999).

Lucas, "Welding Breakthrough: Generating and Handling a Microwave Powered Plasma," Australian Industry News, Information & Suppliers, 7 pages (Sep. 2001)—http://www.industry/search.com.au/features/microwave.asp.

"Welding Plastic Parts," Business New Publishing Company, 4 pages (Nov. 2000)—http://www.assemblymag.com/Common/print_article.asp?rID=E455512C17534C31B96D.

Xie et al., "Effect of Rare Earths in Steels on the Thermochemical Treatments and the Functional Mechanisms of the Rare Earths," *Rare Metals Materials and Engineering* 26(1):52-55 (Feb. 1997) (English Abstract).

Yahoo Canada—Autos, "Catalytic Converter Answer2," 4 pages (2001)—http://ca.autos.yahoo.com/maintain/catalytic_converteranswer2.html.

International Search Report issued on Jul. 23, 2003, in PCT/US03/14037.

International Search Report issued on Aug. 15, 2003, in PCT/US03/14124.

International Search Report issued on Sep. 10, 2003, in PCT/US03/14132.

International Search Report issued on Aug. 14, 2003, in PCT/US03/14052.

International Search Report issued on Aug. 14, 2003, in PCT/US03/14054.

International Search Report issued on May 10, 2004, in PCT/US03/14036.

International Search Report issued on Aug. 9, 2003, in PCT/US03/14053.

International Search Report issued on Feb. 25, 2004, in PCT/US03/14034.

International Search Report issued on Sep. 19, 2003, in PCT/US03/14039.

International Search Report issued on Aug. 29, 2003, in PCT/US03/14038.

International Search Report issued on Dec. 30, 2003, in PCT/US03/14133.

International Search Report issued on Aug. 28, 2003, in PCT/US03/14035.

International Search Report issued on Jul. 29, 2003, in PCT/US03/14040.

International Search Report issued on Sep. 10, 2003, in PCT/US03/14134.

International Search Report issued on Aug. 29, 2003, in PCT/US03/14122.

International Search Report issued on Sep. 30, 2003, in PCT/US03/14130.

International Search Report issued on May 24, 2004, in PCT/US03/14055.

International Search Report issued on May 26, 2004, in PCT/US03/14137.

International Search Report issued on Aug. 29, 2003, in PCT/US03/14123.

International Search Report issued on Aug. 29, 2003, in PCT/US03/14121.

International Search Report issued on Sep. 16, 2003, in PCT/US03/14136.

International Search Report issued on May 25, 2004, in PCT/US03/14135.

Reply to Office Action filed on Nov. 18, 2004, in U.S. Appl. No. 10/430,426.

* cited by examiner

US 7,497,922 B2

PLASMA-ASSISTED GAS PRODUCTION

CROSS-REFERENCE OF RELATED APPLICATIONS

Priority is claimed to U.S. Provisional Patent Application No. 60/378,693, filed May 8, 2002, No. 60/430,677, filed Dec. 4, 2002, and No. 60/435,278, filed Dec. 23, 2002, all of which are fully incorporated herein by reference.

FIELD OF THE INVENTION

This invention relates to methods and apparatus for plasma-assisted gas production, including hydrogen production.

BACKGROUND OF THE INVENTION

It is known that plasmas can be used to produce gas. However, such methods can be limited by a number of factors, including the conditions required to ignite, modulate, and sustain plasmas and the rates at which gases can be produced. Moreover, some conventional methods and apparatus use vacuum equipment to ignite the plasma, however the use of such equipment can limit gas production flexibility.

BRIEF SUMMARY OF A FEW ASPECTS OF THE INVENTION

A plasma-assisted gas production method may be provided. The method can include (1) flowing a gas into a cavity, wherein the gas includes at least a first species, (2) subjecting the gas to electromagnetic radiation having a frequency less than about 333 GHz such that a plasma forms in the cavity, wherein the cavity is in fluid communication with at least one filter, (3) extracting the first species through the filter, and (4) collecting the first species.

A plasma-assisted gas production apparatus may also be provided. The apparatus can include (1) a cavity configured such that a plasma can form therein by subjecting a gas to radiation having a frequency less than about 333 GHz, (2) at least one filter associated with the cavity having a plasma-facing side and a plasma-opposing side, wherein the filter is configured to selectively permit a first species, and substantially prevents other species, which may be present in the plasma, to pass through the filter, (3) a gas source connected to the cavity for supplying the gas to the cavity, (4) a radiation source connected to the cavity for supplying the radiation to the cavity, and (5) a collection device in communication with the plasma-opposing side of the filter.

A plasma catalyst for initiating, modulating, and sustaining a plasma may further be provided. The catalyst can be passive or active. A passive plasma catalyst can include any object capable of inducing a plasma by deforming a local electric field (e.g., an electromagnetic field) consistent with this invention, without necessarily adding additional energy. An active plasma catalyst, on the other hand, is any particle or high energy wave packet capable of transferring a sufficient amount of energy to a gaseous atom or molecule to remove at least one electron from the gaseous atom or molecule in the presence of electromagnetic radiation. In both cases, a plasma catalyst can improve, or relax, the environmental conditions required to ignite a plasma.

Additional plasma catalysts, and methods and apparatus for igniting, modulating, and sustaining a plasma for producing a gas consistent with this invention are also provided.

BRIEF DESCRIPTION OF THE DRAWINGS

Further aspects of the invention will be apparent upon consideration of the following detailed description, taken in conjunction with the accompanying drawings, in which like reference characters refer to like parts throughout, and in which.

DETAILED DESCRIPTION OF THE EMBODIMENTS

This invention relates to methods and apparatus for plasma-assisted gas production, and can be used to lower energy costs and increase gas production efficiency and flexibility.

The following commonly owned, concurrently filed U.S. patent applications are hereby incorporated by reference in their entireties: U.S. patent application Ser. No. 10/513,221, U.S. patent application Ser. No. 10/13,393, PCT Application US03/14132, now expired, U.S. patent application Ser. No.

10/513,394, U.S. patent application Ser. No. 10/513,305, U.S. patent application Ser. No. 10/513,607, U.S. patent application Ser. No. 10/449,600, PCT Application US03/14034, now expired, U.S. patent application Ser. No. 10/430,416, U.S. patent application Ser. No. 10/430,415, PCT Application US03/14133, now expired, U.S. patent application Ser. No. 10/513,606, U.S. patent application Ser. No. 10/513,309, PCT Application US03/14122, U.S. patent application Ser. No. 10/513,397, U.S. patent application Ser. No. 10/513,605, PCT Application US03/14137, now expired, U.S. patent application Ser. No. 10/430,426, PCT Application US03/14121, now expired, U.S. patent application Ser. No. 10/513,604, and PCT Application US03/14135, now expired.

Illustrative Plasma System

Figure 1:
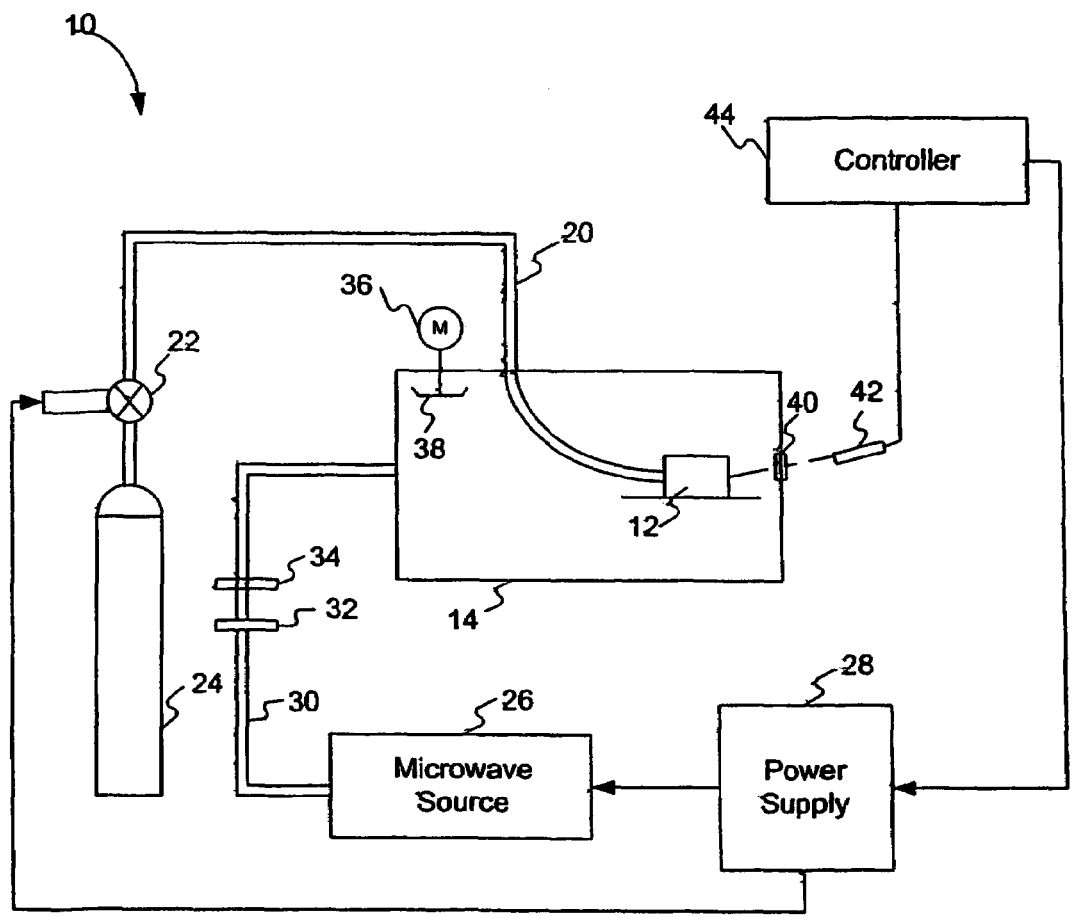
FIG. 1 shows a schematic diagram of an illustrative plasma-assisted gas production system consistent with this invention.

FIG. 1 shows illustrative plasma system 10 consistent with one aspect of this invention. In this embodiment, cavity 12 is formed in a vessel that is positioned inside radiation chamber (i.e., applicator) 14. In another embodiment (not shown), the vessel 12 and radiation chamber 14 are the same, thereby eliminating the need for two separate components. The vessel in which cavity 12 is formed can include one or more radiation-transmissive insulating layers to improve its thermal insulation properties without significantly shielding cavity 12 from the radiation. As described more fully below, system 10 can be used to produce gas consistent with this invention.

In one embodiment, cavity 12 is formed in a vessel made of ceramic. Due to the extremely high temperatures that can be achieved with plasmas consistent with this invention, a ceramic capable of operating at about 3,000 degrees Fahrenheit can be used. The ceramic material can include, by weight, 29.8% silica, 68.2% alumina, 0.4% ferric oxide, 1% titania, 0.1% lime, 0.1% magnesia, 0.4% alkalies, which is sold under Model No. LW-30 by New Castle Refractories Company, of New Castle, Pa. It will be appreciated by those of ordinary skill in the art, however, that other materials, such as quartz, and those different from the one described above, can also be used consistent with the invention.

In one successful experiment, a plasma was formed in a partially open cavity inside a first brick and topped with a second brick. The cavity had dimensions of about 2 inches by about 2 inches by about 1.5 inches. At least two holes were also provided in the brick in communication with the cavity: one for viewing the plasma and at least one hole for providing the gas. The size of the cavity can depend on the desired plasma process being performed. Also, the cavity can at least be configured to prevent the plasma from rising/floating away from the primary gas production region (e.g., the surface of a filter).

Cavity 12 can be connected to one or more gas sources 24 (e.g., a source of argon, nitrogen, xenon, krypton, hydrocarbon, or another hydrogen-containing gas) by line 20 and control valve 22, which may be powered by power supply 28. Line 20 may be tubing (e.g., between about 1/16 inch and about 1/4 inch, such as about 1/8"). Also, if desired, a vacuum pump can be connected to the chamber to remove any fumes that may be generated during plasma processing.

A radiation leak detector (not shown) was installed near source 26 and waveguide 30 and connected to a safety interlock system to automatically turn off the radiation (e.g., microwave) power supply if a leak above a predefined safety limit, such as one specified by the FCC and/or OSHA (e.g., 5 $mW/cm^2$), was detected.

Radiation source 26, which may be powered by electrical power supply 28, can direct radiation energy into chamber 14 through one or more waveguides 30. It will be appreciated by those of ordinary skill in the art that source 26 can be connected directly to cavity 12 or chamber 14, thereby eliminating waveguide 30. The radiation energy entering cavity 12 is used to ignite a plasma within the cavity. This plasma can be substantially sustained and confined to the cavity by coupling additional radiation with the catalyst.

Radiation energy can be supplied through circulator 32 and tuner 34 (e.g., 3-stub tuner). Tuner 34 can be used to minimize the reflected power as a function of changing ignition or processing conditions, especially before the plasma has formed because microwave power, for example, will be strongly absorbed by the plasma.

As explained more fully below, the location of radiation-transmissive cavity 12 in chamber 14 may not be critical if chamber 14 supports multiple modes, and especially when the modes are continually or periodically mixed. As also explained more fully below, motor 36 can be connected to mode-mixer 38 for making the time-averaged radiation energy distribution substantially uniform throughout chamber 14. Furthermore, window 40 (e.g., a quartz window) can be disposed in one wall of chamber 14 adjacent to cavity 12, permitting temperature sensor 42 (e.g., an optical pyrometer) to be used to view a process inside cavity 12. In one embodiment, the optical pyrometer output can increase from zero volts as the temperature rises to within the tracking range.

Sensor 42 can develop output signals as a function of the temperature or any other monitorable condition associated with a work piece (not shown) within cavity 12 and provide the signals to controller 44. Dual temperature sensing and heating, as well as automated cooling rate and gas flow controls can also be used. Controller 44 in turn can be used to control operation of power supply 28, which can have one output connected to source 26 as described above and another output connected to valve 22 to control gas flow into cavity 12.

The invention may be practiced, for example, with a microwave source at 2.45 GHz provided by Communications and flower Industries (CPI), although radiation having any frequency less than about 333 GHz can be used. The 2.45 GHz system provided continuously variable microwave power from about 0.5 kilowatts to about 5.0 kilowatts. A 3-stub tuner allowed impedance matching for maximum power transfer and a dual directional coupler (not shown) was used to measure forward and reflected powers. Also, optical pyrometers were used for remote sensing of the sample temperature.

As mentioned above, radiation having any frequency less than about 333 GHz can be used consistent with this invention. For example, frequencies, such as power line frequencies (about 50 Hz to about 60 Hz), can be used, although the pressure of the gas from which the plasma is formed may be lowered to assist with plasma ignition. Also, any radio frequency or microwave frequency can be used consistent with this invention, including frequencies greater than about 100 kHz. In most cases, the gas pressure for such relatively high frequencies need not be lowered to ignite, modulate, or sustain a plasma, thereby enabling many plasma-assisted, gas production methods to occur at atmospheric pressures and above.

The equipment was be computer controlled using LabView 6i software, which provided real-time temperature monitoring and microwave power control. Noise was reduced by using sliding averages of suitable number of data points. Also, to improve speed and computational efficiency, the number of stored data points in the buffer array were limited by using shift-registers and buffer-sizing. The pyrometer measured the temperature of a sensitive area of about 1 $cm^2$, which was used to calculate an average temperature. The pyrometer sensed radiant intensities at two wavelengths and fit those intensities using Planck's law to determine the temperature. It will be appreciated, however, that other devices and methods for monitoring and controlling temperature are also available and can be used consistent with this invention. For example, control software that can be used consistent with this invention is described in commonly owned, concurrently filed Kumar et al., PCT Application US03/14135, now expired which is hereby incorporated by reference in its entirety.

Chamber 14 had several glass-covered viewing ports with radiation shields and one quartz window for pyrometer access. Several ports for connection to a vacuum pump and a gas source were also provided, although not necessarily used.

System 10 also included a closed-loop deionized water cooling system (not shown) with an external heat exchanger cooled by tap water. During operation, the deionized water first cooled the magnetron, then the load-ump in the circulator (used to protect the magnetron), and finally the radiation chamber through water channels welded on the outer surface of the chamber.

Plasma Catalysts

A plasma catalyst consistent with this invention can include one or more different materials and may be either passive or active. A plasma catalyst can be used, among other things, to ignite, modulate, and/or sustain a plasma at a gas pressure that is less than, equal to, or greater than atmospheric pressure.

One method of forming a plasma consistent with this invention can include subjecting a gas in a cavity to electromagnetic radiation having a frequency less than about 333 GHz in the presence of a passive plasma catalyst. A passive plasma catalyst consistent with this invention can include any object capable of inducing a plasma by deforming a local electric field (e.g., an electromagnetic field) consistent with this invention, without necessarily adding additional energy through the catalyst, such as by applying an electric voltage to create a spark.

A passive plasma catalyst consistent with this invention can also be a nano-particle or a nano-tube. As used herein, the term "nano-particle" can include any particle having a maximum physical dimension less than about 100 nm that is at least electrically semi-conductive. Also, both single-walled and multi-walled carbon nanotubes, doped and undoped, can be particularly effective for igniting plasmas consistent with this invention because of their exceptional electrical conductivity and elongated shape. The nanotubes can have any convenient length and can be a powder fixed to a substrate. If fixed, the nanotubes can be oriented randomly on the surface of the substrate or fixed to the substrate (e.g., at some predetermined orientation) while the plasma is ignited or sustained.

A passive plasma catalyst can also be a powder consistent with this invention, and need not comprise nano-particles or nano-tubes. It can be formed, for example, from fibers, dust particles, flakes, sheets, etc. When in powder form, the catalyst can be suspended, at least temporarily, in a gas. By suspending the powder in the gas, the powder can be quickly dispersed throughout the cavity and more easily consumed, if desired.

Figure 1A:
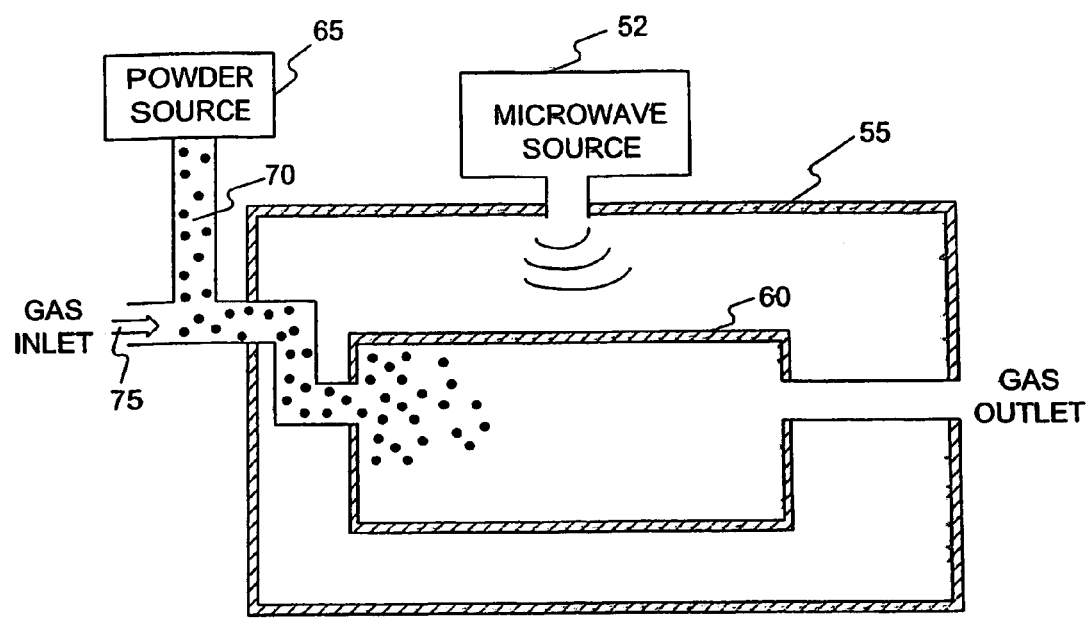
FIG. 1A shows an illustrative embodiment of a portion of a plasma-assisted gas production system for adding a powder plasma catalyst to a plasma cavity for igniting, modulating, or sustaining a plasma in a cavity consistent with this invention.

In one embodiment, the powder catalyst can be carried into the cavity and at least temporarily suspended with a carrier gas. The carrier gas can be the same or different from the gas that forms the plasma. Also, the powder can be added to the gas prior to being introduced to the cavity. For example, as shown in FIG. 1A, radiation source 52 can supply radiation to radiation cavity 55, in which plasma cavity 60 is placed. Powder source 65 can provide catalytic powder 70 into gas stream 75. In an alternative embodiment, powder 70 can be first added to cavity 60 in bulk (e.g., in a pile) and then distributed in the cavity in any number of ways, including flowing a gas through or over the bulk powder. In addition, the powder can be added to the gas for igniting, modulating, or sustaining a plasma by moving, conveying, drizzling, sprinkling, blowing, or otherwise, feeding the powder into or within the cavity.

In one experiment, a plasma was ignited in a cavity by placing a pile of carbon fiber powder in a copper pipe that extended into the cavity. Although sufficient radiation was directed into the cavity, the copper pipe shielded the powder from the radiation and no plasma ignition took place. However, once a carrier gas began flowing through the pipe, forcing the powder out of the pipe and into the cavity, and thereby subjecting the powder to the radiation, a plasma was nearly instantaneously ignited in the cavity.

A powder plasma catalyst consistent with this invention can be substantially non-combustible, thus it need not contain oxygen or burn in the presence of oxygen. Thus, as mentioned above, the catalyst can include a metal, carbon, a carbon-based alloy, a carbon-based composite, an electrically conductive polymer, a conductive silicone elastomer, a polymer nanocomposite, an organic-inorganic composite, and any combination thereof.

Also, powder catalysts can be substantially uniformly distributed in the plasma cavity (e.g., when suspended in a gas), and plasma ignition can be precisely controlled within the cavity. Uniform ignition can be important in certain applications, including those applications requiring brief plasma exposures, such as in the form of one or more bursts. Still, a certain amount of time can be required for a powder catalyst to distribute itself throughout a cavity, especially in complicated, multi-chamber cavities. Therefore, consistent with another aspect of this invention, a powder catalyst can be introduced into the cavity through a plurality of ignition ports to more rapidly obtain a more uniform catalyst distribution therein (see below).

In addition to powder, a passive plasma catalyst consistent with this invention can include, for example, one or more microscopic or macroscopic fibers, sheets, needles, threads, strands, filaments, yarns, twines, shavings, slivers, chips, woven fabrics, tape, whiskers, or any combination thereof. In these cases, the plasma catalyst can have at least one portion with one physical dimension substantially larger than another physical dimension. For example, the ratio between at least two orthogonal dimensions can be at least about 1:2, but could be greater than about 1:5, or even greater than about 1:10.

Thus, a passive plasma catalyst can include at least one portion of material that is relatively thin compared to its length. A bundle of catalysts (e.g., fibers) may also be used and can include, for example, a section of graphite tape. In one experiment, a section of tape having approximately thirty thousand strands of graphite fiber, each about 2-3 microns in diameter, was successfully used. The number of fibers in and the length of a bundle are not critical to igniting, modulating, or sustaining the plasma. For example, satisfactory results have been obtained using a section of graphite tape about one-quarter inch long. One type of carbon fiber that has been successfully used consistent with this invention is sold under the trademark Magnamite®, Model No. AS4C-GP3K, by the Hexcel Corporation, of Anderson, S.C. Also, silicon-carbide fibers have been successfully used.

A passive plasma catalyst consistent with another aspect of this invention can include one or more portions that are, for example, substantially spherical, annular, pyramidal, cubic, planar, cylindrical, rectangular or elongated.

The passive plasma catalysts discussed above can include at least one material that is at least electrically semi-conductive. In one embodiment, the material can be highly conductive. For example, a passive plasma catalyst consistent with this invention can include a metal, an inorganic material, carbon, a carbon-based alloy, a carbon-based composite, an electrically conductive polymer, a conductive silicone elastomer, a polymer nanocomposite, an organic-inorganic composite, or any combination thereof. Some of the possible inorganic materials that can be included in the plasma catalyst include carbon, silicon carbide, molybdenum, platinum, tantalum, tungsten, carbon nitride, and aluminum, although other electrically conductive inorganic materials may work just as well.

In addition to one or more electrically conductive materials, a passive plasma catalyst consistent with this invention can include one or more additives (which need not be electrically conductive). As used herein, the additive can include any material that a user wishes to add to the plasma. Therefore, the catalyst can include the additive itself, or it can include a precursor material that, upon decomposition, can form the additive. Thus, the plasma catalyst can include one or more additives and one or more electrically conductive materials in any desirable ratio, depending on the ultimate desired composition of the plasma and the process using the plasma.

The ratio of the electrically conductive components to the additives in a passive plasma catalyst can vary over time while being consumed. For example, during ignition, the plasma catalyst could desirably include a relatively large percentage of electrically conductive components to improve the ignition conditions. On the other hand, if used while sustaining the plasma, the catalyst could include a relatively large percentage of additives. It will be appreciated by those of ordinary skill in the art that the component ratio of the plasma-catalyst used to ignite and sustain the plasma could be the same.

A predetermined ratio profile can be used to simplify many plasma processes. In many conventional plasma processes, the components within the plasma are added as necessary, but such addition normally requires programmable equipment to add the components according to a predetermined schedule. However, consistent with this invention, the ratio of components in the catalyst can be varied, and thus the ratio of components in the plasma itself can be automatically varied. That is, the ratio of components in the plasma at any particular time can depend on which of the catalyst portions is currently being consumed by the plasma. Thus, the catalyst component ratio can be different at different locations within the catalyst. And, the current ratio of components in a plasma can depend on the portions of the catalyst currently and/or previously consumed, especially when the flow rate of a gas passing through the plasma chamber is relatively slow.

Figure 2:
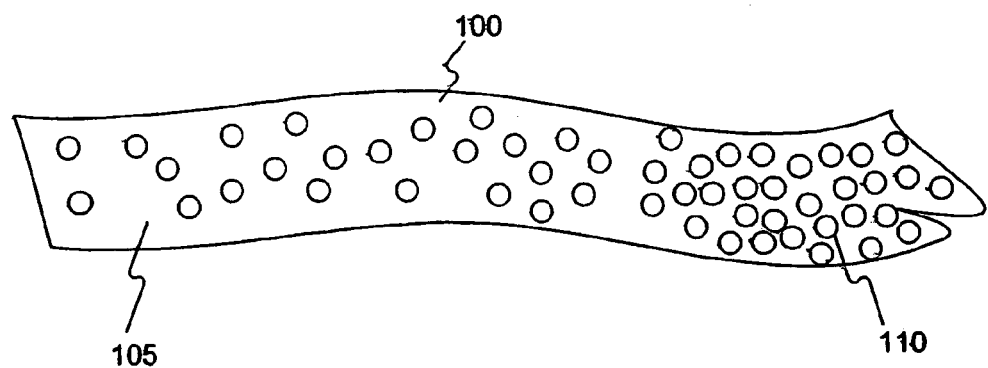
FIG. 2 shows an illustrative plasma catalyst fiber with at least one component having a concentration gradient along its length consistent with this invention.

A passive plasma catalyst consistent with this invention can be homogeneous, inhomogeneous, or graded. Also, the plasma catalyst component ratio can vary continuously or discontinuously throughout the catalyst. For example, in FIG. 2, the ratio can vary smoothly forming a gradient along a length of catalyst 100. Catalyst 100 can include a strand of material that includes a relatively low concentration of a component at section 105 and a continuously increasing concentration toward section 110.

Figure 3:
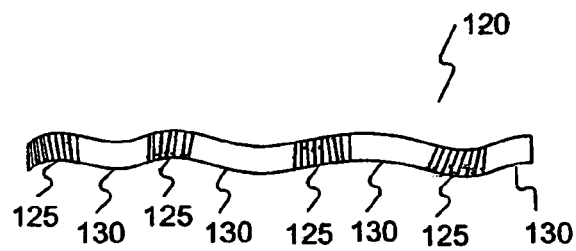
FIG. 3 shows an illustrative plasma catalyst fiber with multiple components at a ratio that varies along its length consistent with this invention.

Alternatively, as shown in FIG. 3, the ratio can vary discontinuously in each portion of catalyst 120, which includes, for example, alternating sections 125 and 130 having different concentrations. It will be appreciated that catalyst 120 can have more than two section types. Thus, the catalytic component ratio being consumed by the plasma can vary in any predetermined fashion. In one embodiment, when the plasma is monitored and a particular additive is detected, further processing can be automatically commenced or terminated.

Another way to vary the ratio of components in a sustained plasma is by introducing multiple catalysts having different component ratios at different times or different rates. For example, multiple catalysts can be introduced at approximately the same location or at different locations within the cavity. When introduced at different locations, the plasma formed in the cavity can have a component concentration gradient determined by the locations of the various catalysts. Thus, an automated system can include a device by which a consumable plasma catalyst is mechanically inserted before and/or during plasma igniting, modulating, and/or sustaining.

Figure 4:
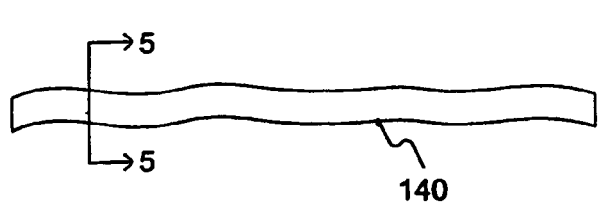
FIG. 4 shows another illustrative plasma catalyst fiber that includes a core under layer and a coating consistent with this invention.
Figure 5:
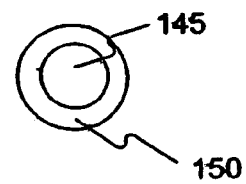
FIG. 5 shows a cross-sectional view of the plasma catalyst fiber of FIG. 4, taken from line 5-5 of FIG. 4 consistent with this invention.

A passive plasma catalyst consistent with this invention can also be coated. In one embodiment, a catalyst can include a substantially non-electrically conductive coating deposited on the surface of a substantially electrically conductive material. Alternatively, the catalyst can include a substantially electrically conductive coating deposited on the surface of a substantially electrically non-conductive material. FIGS. 4 and 5, for example, show fiber 140, which includes underlayer 145 and coating 150. In one embodiment, a plasma catalyst including a carbon core is coated with nickel to prevent oxidation of the carbon.

A single plasma catalyst can also include multiple coatings. If the coatings are consumed during contact with the plasma, the coatings could be introduced into the plasma sequentially, from the outer coating to the innermost coating, thereby creating a time-release mechanism. Thus, a coated plasma catalyst can include any number of materials, as long as a portion of the catalyst is at least electrically semi-conductive.

Consistent with another embodiment of this invention, a plasma catalyst can be located entirely within a radiation cavity to substantially reduce or prevent radiation energy leakage. In this way, the plasma catalyst does not electrically or magnetically couple with the vessel containing the cavity or to any electrically conductive object outside the cavity. This prevents sparking at the ignition port and prevents radiation from leaking outside the cavity during the ignition and possibly later if the plasma is sustained. In one embodiment, the catalyst can be located at a tip of a substantially electrically non-conductive extender that extends through an ignition port.

Figure 6:
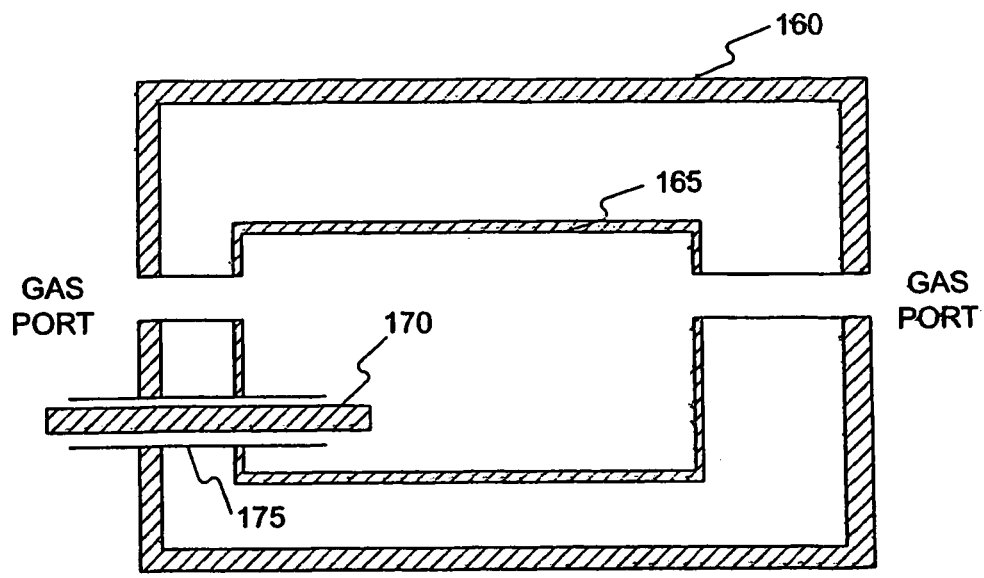
FIG. 6 shows an illustrative embodiment of another portion of a plasma system including an elongated plasma catalyst that extends through ignition port consistent with this invention.
Figure 7:
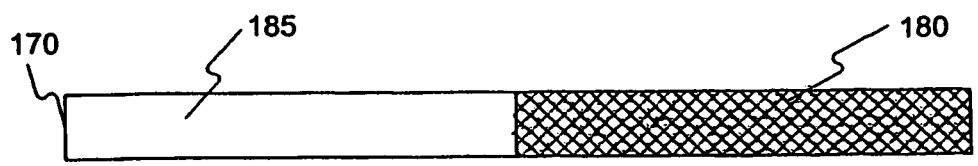
FIG. 7 shows an illustrative embodiment of an elongated plasma catalyst that can be used in the system of FIG. 6 consistent with this invention.

FIG. 6, for example, shows radiation chamber 160 in which plasma cavity 165 is placed. Plasma catalyst 170 is elongated and extends through ignition port 175. As shown in FIG. 7, and consistent with this invention, catalyst 170 can include electrically conductive distal portion 180 (which is placed in chamber 160) and electrically non-conductive portion 185 (which is placed substantially outside chamber 160, but can extend somewhat into chamber 160). This configuration can prevent an electrical connection (e.g., sparking) between distal portion 180 and chamber 160.

Figure 8:
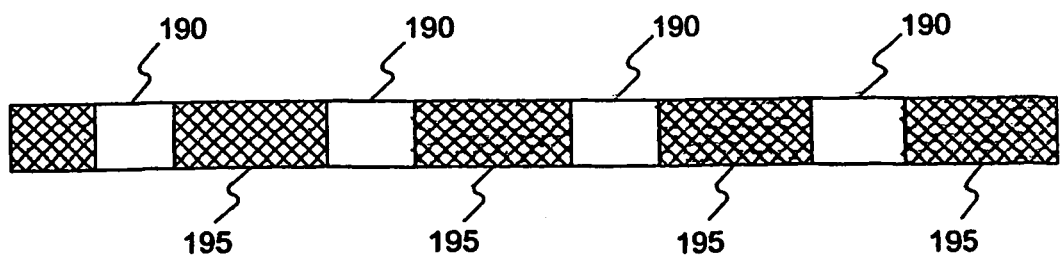
FIG. 8 shows another illustrative embodiment of an elongated plasma catalyst that can be used in the system of FIG. 6 consistent with this invention.

In another embodiment, shown in FIG. 8, the catalyst can be formed from a plurality of electrically conductive segments 190 separated by and mechanically connected to a plurality of electrically non-conductive segments 195. In this embodiment, the catalyst can extend through the ignition port between a point inside the cavity and another point outside the cavity, but the electrically discontinuous profile significantly prevents sparking and energy leakage.

Another method of forming a plasma consistent with this invention includes subjecting a gas in a cavity to electromagnetic radiation having a frequency less than about 333 GHz in the presence of an active plasma catalyst, which generates or includes at least one ionizing particle.

An active plasma catalyst consistent with this invention can be any particle or high energy wave packet capable of transferring a sufficient amount of energy to a gaseous atom or molecule to remove at least one electron from the gaseous atom or molecule in the presence of electromagnetic radiation. Depending on the source, the ionizing particles can be directed into the cavity in the form of a focused or collimated beam, or they may be sprayed, spewed, sputtered, or otherwise introduced.

Figure 9:
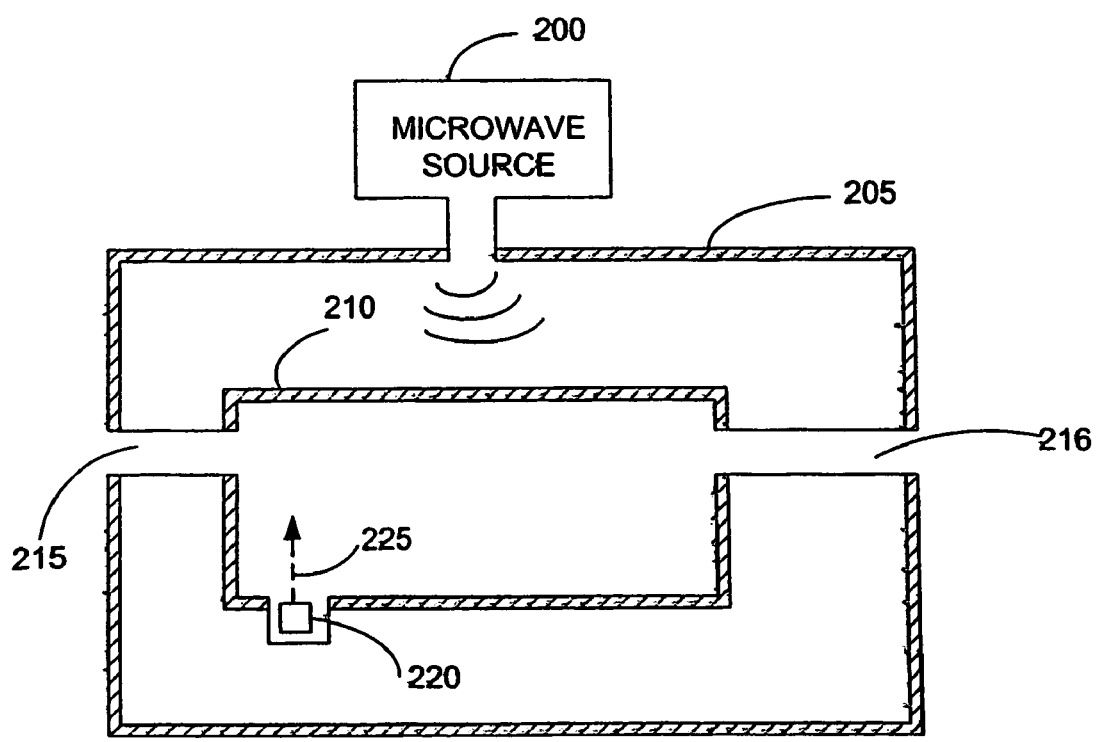
FIG. 9 shows an illustrative embodiment of a portion of a plasma-assisted gas production system for directing ionizing radiation into a radiation chamber consistent with this invention.

For example, FIG. 9 shows radiation source 200 directing radiation into radiation chamber 205. Plasma cavity 210 is positioned inside of chamber 205 and may permit a gas to flow therethrough via ports 215 and 216. Source 220 can direct ionizing particles 225 into cavity 210. Source 220 can be protected, for example, by a metallic screen which allows the ionizing particles to pass through but shields source 220 from radiation. If necessary, source 220 can be water-cooled.

Examples of ionizing particles consistent with this invention can include x-ray particles, gamma ray particles, alpha particles, beta particles, neutrons, protons, and any combination thereof. Thus, an ionizing particle catalyst can be charged (e.g., an ion from an ion source) or uncharged and can be the product of a radioactive fission process. In one embodiment, the vessel in which the plasma cavity is formed could be entirely or partially transmissive to the ionizing particle catalyst. Thus, when a radioactive fission source is located outside the cavity, the source can direct the fission products through the vessel to ignite the plasma. The radioactive fission source can be located inside the radiation chamber to substantially prevent the fission products (i.e., the ionizing particle catalyst) from creating a safety hazard.

In another embodiment, the ionizing particle can be a free electron, but it need not be emitted in a radioactive decay process. For example, the electron can be introduced into the cavity by energizing the electron source (such as a metal), such that the electrons have sufficient energy to escape from the source. The electron source can be located inside the cavity, adjacent the cavity, or even in the cavity wall. It will be appreciated by those of ordinary skill in the art that the any combination of electron sources is possible. A common way to produce electrons is to heat a metal, and these electrons can be further accelerated by applying an electric field.

In addition to electrons, free energetic protons can also be used to catalyze a plasma. In one embodiment, a free proton can be generated by ionizing hydrogen and, optionally, accelerated with an electric field.

Multi-Mode Radiation Cavities

A radiation waveguide, cavity, or chamber can be designed to support or facilitate propagation of at least one electromagnetic radiation mode. As used herein, the term "mode" refers to a particular pattern of any standing or propagating electromagnetic wave that satisfies Maxwell's equations and the applicable boundary conditions (e.g., of the cavity). In a waveguide or cavity, the mode can be any one of the various possible patterns of propagating or standing electromagnetic fields. Each mode is characterized by its frequency and polarization of the electric field and/or the magnetic field vectors. The electromagnetic field pattern of a mode depends on the frequency, refractive indices or dielectric constants, and waveguide or cavity geometry.

A transverse electric (TE) mode is one whose electric field vector is normal to the direction of propagation. Similarly, a transverse magnetic (TM) mode is one whose magnetic field vector is normal to the direction of propagation. A transverse electric and magnetic (TEM) mode is one whose electric and magnetic field vectors are both normal to the direction of propagation. A hollow metallic waveguide does not typically support a normal TEM mode of radiation propagation. Even though radiation appears to travel along the length of a waveguide, it may do so only by reflecting off the inner walls of the waveguide at some angle. Hence, depending upon the propagation mode, the radiation (e.g., microwave) may have either some electric field component or some magnetic field component along the axis of the waveguide (often referred to as the z-axis).

The actual field distribution inside a cavity or waveguide is a superposition of the modes therein. Each of the modes can be identified with one or more subscripts (e.g., $TE_{10}$ ("tee ee one zero"). The subscripts normally specify how many "half waves" at the guide wavelength are contained in the x and y directions. It will be appreciated by those skilled in the art that the guide wavelength can be different from the free space wavelength because radiation propagates inside the waveguide by reflecting at some angle from the inner walls of the waveguide. In some cases, a third subscript can be added to define the number of half waves in the standing wave pattern along the z-axis.

For a given radiation frequency, the size of the waveguide can be selected to be small enough so that it can support a single propagation mode. In such a case, the system is called a single-mode system (i.e., a single-mode applicator). The $TE_{10}$ mode is usually dominant in a rectangular single-mode waveguide. As the size of the waveguide (or the cavity to which the waveguide is connected) increases, the waveguide or applicator can sometimes support additional higher order modes forming a multi-mode system. When many modes are capable of being supported simultaneously, the system is often referred to as highly moded.

A simple, single-mode system has a field distribution that includes at least one maximum and/or minimum. The magnitude of a maximum largely depends on the amount of radiation supplied to the system. Thus, the field distribution of a single mode system is strongly varying and substantially non-uniform.

Unlike a single-mode cavity, a multi-mode cavity can support several propagation modes simultaneously, which, when superimposed, results in a complex field distribution pattern. In such a pattern, the fields tend to spatially smear and, thus, the field distribution usually does not show the same types of strong minima and maxima field values within the cavity. In addition, as explained more fully below, a mode-mixer can be used to "stir" or "redistribute" modes (e.g., by mechanical movement of a radiation reflector). This redistribution desirably provides a more uniform time-averaged field distribution within the cavity.

A multi-mode cavity consistent with this invention can support at least two modes, and may support many more than two modes. Each mode has a maximum electric field vector. Although there may be two or more modes, one mode may be dominant and has a maximum electric field vector magnitude that is larger than the other modes. As used herein, a multimode cavity may be any cavity in which the ratio between the first and second mode magnitudes is less than about 1:10, or less than about 1:5, or even less than about 1:2. It will be appreciated by those of ordinary skill in the art that the smaller the ratio, the more distributed the electric field energy between the modes, and hence the more distributed the radiation energy is in the cavity.

The distribution of plasma within a plasma cavity may strongly depend on the distribution of the applied radiation. For example, in a pure single mode system, there may only be a single location at which the electric field is a maximum. Therefore, a strong plasma may only form at that single location. In many applications, such a strongly localized plasma could undesirably lead to non-uniform plasma treatment or heating (i.e., localized overheating and underheating).

Whether or not a single or multi-mode cavity is used consistent with this invention, it will be appreciated by those of ordinary skill in the art that the cavity in which the plasma is formed can be completely closed or partially open. For example, in certain applications, such as in plasma-assisted furnaces, the cavity could be entirely closed. See, for example, commonly owned, concurrently filed Kumar et al. PCT Application US03/14133, now expired, which is fully incorporated herein by reference. In other applications, however, it may be desirable to flow a gas through the cavity, and therefore the cavity must be open to some degree. In this way, the flow, type, and pressure of the flowing gas can be varied over time. This may be desirable because certain gases that facilitate plasma formation, such as argon, are easier to ignite but may not be needed during subsequent plasma processing.

Mode-Mixing

For many plasma-assisted applications, a cavity containing a uniform plasma is desirable. However, because microwave radiation can have a relatively long wavelength (e.g., several tens of centimeters), obtaining a uniform distribution can be difficult to achieve. As a result, consistent with one aspect of this invention, the radiation modes in a multi-mode cavity can be mixed, or redistributed, over a period of time. Because the field distribution within the cavity must satisfy all of the boundary conditions set by the inner surface of the cavity (e.g., if metallic), those field distributions can be changed by changing the position of any portion of that inner surface.

In one embodiment consistent with this invention, a movable reflective surface can be located inside the radiation cavity. The shape and motion of the reflective surface should, when combined, change the inner surface of the cavity during motion. For example, an "L" shaped metallic object (i.e., "mode-mixer") when rotated about any axis will change the location or the orientation of the reflective surfaces in the cavity and therefore change the radiation distribution therein. Any other asymmetrically shaped object can also be used (when rotated), but symmetrically shaped objects can also work, as long as the relative motion (e.g., rotation, translation, or a combination of both) causes some change in the location or orientation of the reflective surfaces. In one embodiment, a mode-mixer can be a cylinder that is rotable about an axis that is not the cylinder's longitudinal axis.

Each mode of a multi-mode cavity may have at least one maximum electric field vector, but each of these vectors could occur periodically across the inner dimension of the cavity. Normally, these maxima are fixed, assuming that the frequency of the radiation does not change. However, by moving a mode-mixer such that it interacts with the radiation, it is possible to move the positions of the maxima. For example, mode-mixer 38 can be used to optimize the field distribution within cavity 14 such that the plasma ignition conditions and/or the plasma sustaining conditions are optimized. Thus, once a plasma is excited, the position of the mode-mixer can be changed to move the position of the maxima for a uniform time-averaged plasma process (e.g., heating).

Thus, consistent with this invention, mode-mixing can be useful during plasma ignition. For example, when an electrically conductive fiber is used as a plasma catalyst, it is known that the fiber's orientation can strongly affect the minimum plasma-ignition conditions. It has been reported, for example, that when such a fiber is oriented at an angle that is greater than 60° to the electric field, the catalyst does little to improve, or relax, these conditions. By moving a reflective surface either in or near the cavity, however, the electric field distribution can be significantly changed.

Mode-mixing can also be achieved by launching the radiation into the applicator chamber through, for example, a rotating waveguide joint that can be mounted inside the applicator chamber. The rotary joint can be mechanically moved (e.g., rotated) to effectively launch the radiation in different directions in the radiation chamber. As a result, a changing field pattern can be generated inside the applicator chamber.

Mode-mixing can also be achieved by launching radiation in the radiation chamber through a flexible waveguide. In one embodiment, the waveguide can be mounted inside the chamber. In another embodiment, the waveguide can extend into the chamber. The position of the end portion of the flexible waveguide can be continually or periodically moved (e.g., bent) in any suitable manner to launch the radiation (e.g., microwave radiation) into the chamber at different directions and/or locations. This movement can also result in mode-mixing and facilitate more uniform plasma processing (e.g., heating) on a time-averaged basis. Alternatively, this movement can be used to optimize the location of a plasma for ignition or other plasma-assisted process.

If the flexible waveguide is rectangular, a simple twisting of the open end of the waveguide will rotate the orientation of the electric and the magnetic field vectors in the radiation inside the applicator chamber. Then, a periodic twisting of the waveguide can result in mode-mixing as well as rotating the electric field, which can be used to assist ignition, modulation, or sustaining of a plasma.

Thus, even if the initial orientation of the catalyst is perpendicular to the electric field, the redirection of the electric field vectors can change the ineffective orientation to a more effective one. Those skilled in the art will appreciate that mode-mixing can be continuous, periodic, or preprogrammed.

In addition to plasma ignition, mode-mixing can be useful during subsequent plasma processing to reduce or create (e.g., tune) "hot spots" in the chamber. When a microwave cavity only supports a small number of modes (e.g., less than 5), one or more localized electric field maxima can lead to "hot spots" (e.g., within cavity 12). In one embodiment, these hot spots could be configured to coincide with one or more separate, but simultaneous, plasma ignitions or processing events. Thus, the plasma catalyst can be located at one or more of those ignition or subsequent processing positions.

Multi-Location Ignition

A plasma can be ignited using multiple plasma catalysts at different locations. In one embodiment, multiple fibers can be used to ignite the plasma at different points within the cavity. Such multi-point ignition can be especially beneficial when a uniform plasma ignition is desired. For example, when a plasma is modulated at a high frequency (i.e., tens of Hertz and higher), or ignited in a relatively large volume, or both, substantially uniform instantaneous striking and restriking of the plasma can be improved. Alternatively, when plasma catalysts are used at multiple points, they can be used to sequentially ignite a plasma at different locations within a plasma chamber by selectively introducing the catalyst at those different locations. In this way, a plasma ignition gradient can be controllably formed within the cavity, if desired.

Also, in a multi-mode cavity, random distribution of the catalyst throughout multiple locations in the cavity increases the likelihood that at least one of the fibers, or any other passive plasma catalyst consistent with this invention, is optimally oriented with the electric field lines. Still, even where the catalyst is not optimally oriented (not substantially aligned with the electric field lines), the ignition conditions are improved.

Furthermore, because a catalytic powder can be suspended in a gas, each powder particle may have the effect of being placed at a different physical location within the cavity, thereby improving ignition uniformity within the cavity.

Dual-Cavity Plasma Igniting/Sustaining

A dual-cavity arrangement can be used to ignite and sustain a plasma consistent with this invention. In one embodiment, a system includes at least a first ignition cavity and a second cavity in fluid communication with the first cavity. To ignite a plasma, a gas in the first ignition cavity can be subjected to electromagnetic radiation having a frequency less than about 333 GHz, optionally in the presence of a plasma catalyst. In this way, the proximity of the first and second cavities may permit a plasma formed in the first cavity to ignite a plasma in the second cavity, which may be sustained with additional electromagnetic radiation.

In one embodiment of this invention, the first cavity can be very small and designed primarily, or solely for plasma ignition. In this way, very little microwave energy may be required to ignite the plasma, permitting easier ignition, especially when a plasma catalyst is used consistent with this invention.

In one embodiment, the first cavity may be a substantially single mode cavity and the second cavity is a multi-mode cavity. When the first ignition cavity only supports a single mode, the electric field distribution may strongly vary within the cavity, forming one or more precisely located electric field maxima. Such maxima are normally the first locations at which plasmas ignite, making them ideal points for placing plasma catalysts. It will be appreciated, however, that when a plasma catalyst is used, it need not be placed in the electric field maximum and, many cases, need not be oriented in any particular direction.

Plasma-Assisted Gas Production

Methods and apparatus for producing a gas from a plasma are provided. Generally, a plasma, including at least an atomic or molecular species, is formed from a gas. The plasma can be brought into contact with a surface of a selective barrier (e.g., filter), which can selectively pass the species and substantially prevent others. In one embodiment, for example, the species can be adsorbed onto the surface of the barrier, pass through the barrier, and be collected on the other side of the barrier.

One type of species that can be collected consistent with this invention is hydrogen. During operation, hydrogen can dissociate on the plasma-facing surface of the filter to produce hydrogen atoms. Then, the hydrogen atoms can combine on the other, low-pressure side of the barrier and desorb as a hydrogen gas molecule. Once hydrogen molecules are formed, they can be collected (e.g., for immediate use or storage).

Figure 10:
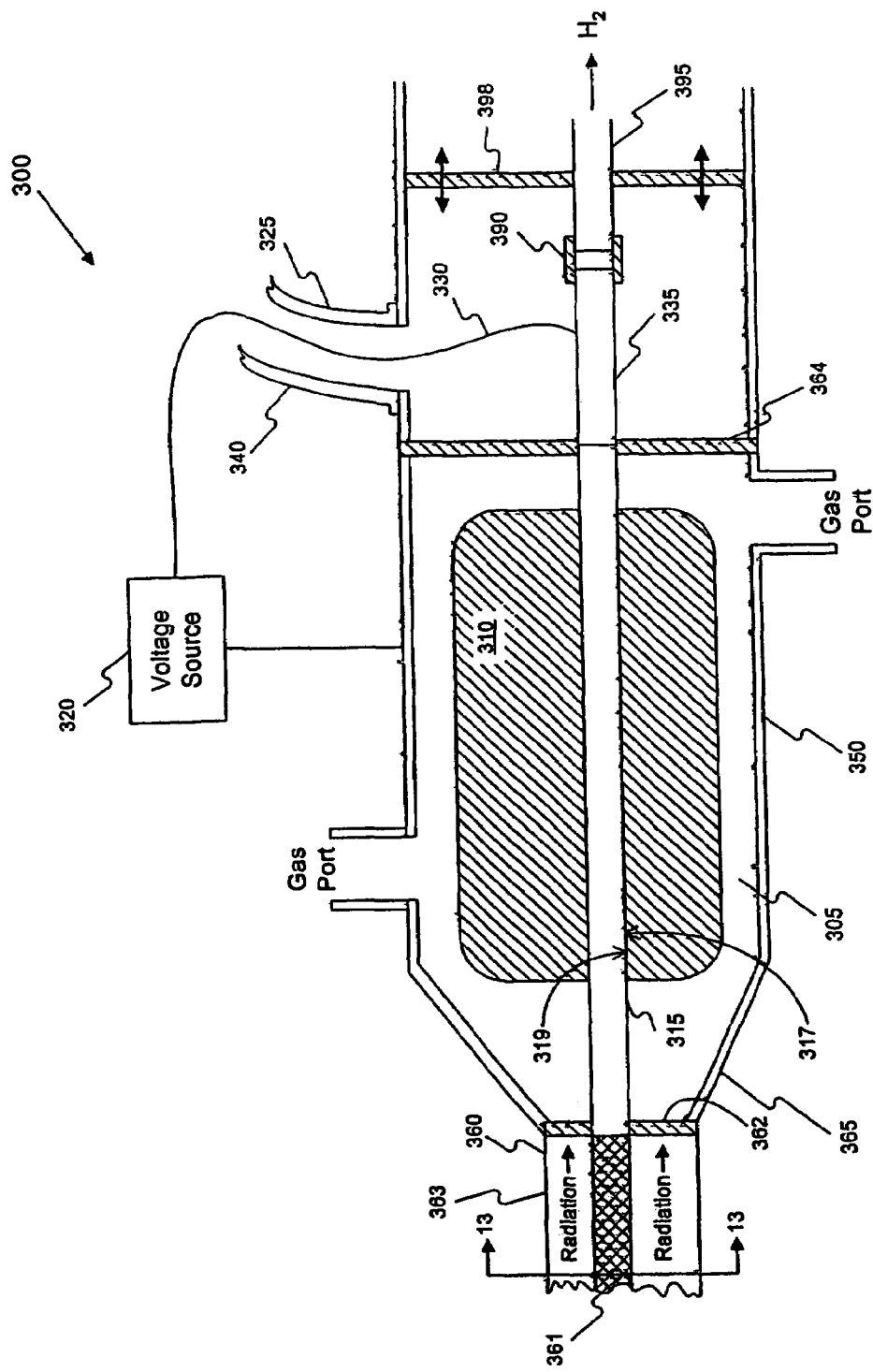
FIG. 10 shows a simplified cross-sectional view of an illustrative apparatus for plasma-assisted gas production consistent with this invention.

FIG. 10 shows a cross-sectional view of illustrative apparatus 300 for plasma-assisted gas production consistent with this invention. Apparatus 300 can include cavity 305 configured such that plasma 310 can form therein by subjecting a gas to electromagnetic radiation having a frequency less than about 333 GHz. As shown in FIG. 10, the gas can be supplied to cavity 305 by a gas source through one or more ports. Any gas containing the desired species can be used. Moreover, those species can be added to the gas separately, and even after the plasma is ignited, if desired.

Some of the gas supplied to cavity 305 can also be removed through one or more different ports. As described more fully below, electromagnetic radiation can be supplied to cavity 305 by an electromagnetic radiation source indirectly through a waveguide or by coupling the source directly to cavity 305. Also, as shown in FIG. 1, the radiation source can also be coupled to an outer chamber, and cavity 305 can be radiation transmissive.

Apparatus 300 can also include at least one filter 315 associated with cavity 305. Filter 315 can be configured to selectively permit a first atomic or molecular species (e.g., hydrogen) to pass through it, and substantially prevent other species (e.g., carbon), that may also be present in plasma 310. The selected species can pass through filter 315 from plasma-facing side 317 to plasma-opposing side 319 of filter 315. After the selected species passes through filter 315, any type of collection device (not shown) in communication with plasma-opposing side 319 can be used to collect the selected species.

Apparatus 300 can also include at least one plasma catalyst in or near cavity 305. The plasma catalyst can be active or passive consistent with this invention, but it can also be any other type of plasma ignition device.

Filter 315 can have any shape (e.g., a tube or a plate), as long as one side is configured to be plasma-facing and another side configured to be plasma-opposing. To maximize gas production, the plasma-facing side can have a relatively large surface area. Filter 315 can be designed to permit hydrogen, for example, to pass through it. In this case, the filter can be formed, for example, from a metal hydride, palladium, palladium oxide, ruthenium-palladium, palladium-silver, palladium-copper, uranium, magnesium, titanium, lithium-aluminum, lanthanum-nickel-aluminum, zirconium, ceramic, any combination thereof, or any alloy thereof. In one embodiment, filter 315 can include a palladium tube.

When palladium or a palladium alloy is used to produce hydrogen, the palladium surface may act as a selective barrier, passing primarily atomic hydrogen through its wall, while substantially excluding other species. Molecular hydrogen can be adsorbed onto the surface where it is dissociated to become atomic hydrogen. Although the invention is not limited to any particular theory, hydrogen atoms may share their electrons with the palladium metal lattice, permitting the hydrogen atoms to diffuse though the lattice in a direction determined by the pressure gradient. The hydrogen atoms may combine on the low-pressure side of the filter and desorb as a hydrogen molecule.

Other types of filter materials can also be used, depending on the type of atomic and/or molecular species being extracted. Moreover, filter 315 can include multiple filtering layers (not shown). In this way, the selected species can be purified by sequentially passing through each layer. Mufti-layer filters consistent with this invention permit the pressure gradient across each filter layer to be smaller than across a single layer, which may make each layer more selective.

Cavity 305 can have any convenient shape capable of substantially confining a plasma. In one embodiment, as shown in FIG. 10, cavity 305 can be formed between inner tube (i.e., filter) 315 and outer tube 350. Outer tube 350 can be electrically conductive to substantially confine radiation, as well as plasma 310. On the other hand, if outer tube 350 is made from a radiation transmissive material, such as ceramic or quartz, it will be appreciated that an additional electrically conductive chamber or shell (such as shown in FIG. 1) can be placed around tube 350 for safety reasons.

As mentioned above, electromagnetic radiation can be supplied to cavity 305 using any type of radiation source in any convenient manner. FIG. 10, for example, shows coaxial waveguide 360 configured to direct electromagnetic radiation into cavity 305 via tapered waveguide 365. Radiation-transmissive barrier 362 can permit radiation to enter cavity 305 but prevent plasma 310 from passing in the other direction, out of cavity 305. In an alternative embodiment, coaxial waveguide 360 can be configured to direct electromagnetic radiation directly into cavity 305, without the use of a tapered waveguide. The use of tapered waveguide 365 permits, however, the use of a larger cavity, which in turn permits filters with larger surface areas. Thus, if the outer diameter of inner conductor 361 is not equal to (e.g., less than) the outer diameter of filter 315, a tapered inner connector can be used to connect the two together.

In one embodiment, outer tube 350 is electrically conductive and electrically conductive end plate 398 can move axially (e.g., inside tube 350). On the one hand, if plasma 310 does not sufficiently absorb the electromagnetic radiation in a single pass, displacement of end plate 398 by a quarter wavelength of the radiation can be used to shift the standing wave pattern inside the cavity (reversing the positions of the minima and maxima). Consequently, a periodic oscillatory motion of endplate 398 by a quarter wavelength will smear out the field distribution over time and remove the hot spots along filter 315.

On the other hand, if plasma 310 absorbs the radiation strongly, the length of the plasma region can be selected so that about half of the radiation is absorbed in a single pass. The distance between barrier 364 and endplate 398 can now be set (e.g., one quarter, three quarters, etc. of a wavelength) to absorb the remaining power "in phase" when the radiation is reflected back from endplate 398. Those with ordinary skill in the art will appreciate that a similar concept can be applied to other designs (e.g., in the apparatus shown in FIG. 11). In any case, mode-shifting can be continuous, periodic, stepwise, or otherwise programmed.

Figure 11:
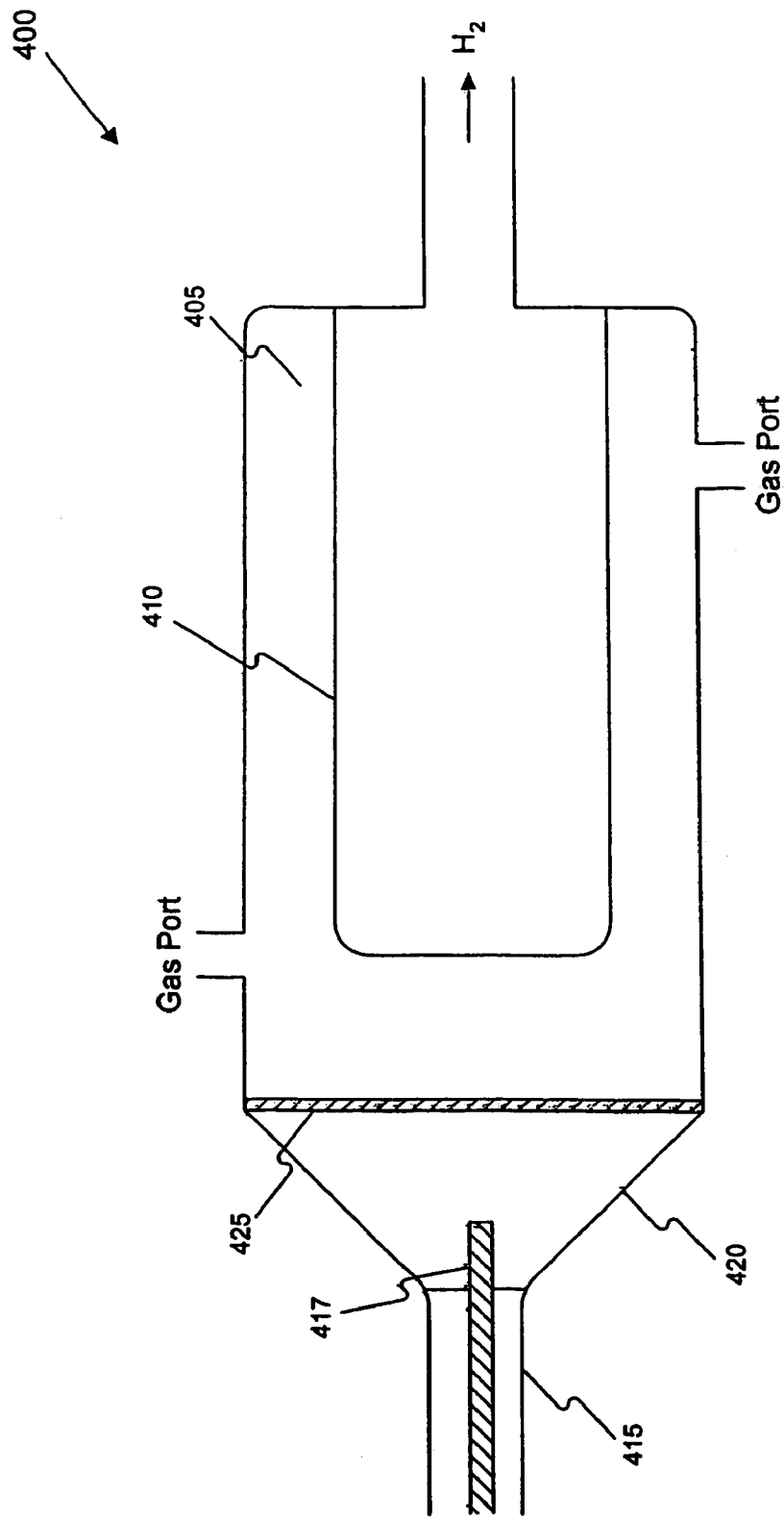
FIG. 11 shows a simplified cross-sectional view of another illustrative gas production apparatus consistent with this invention.

For example, a larger cavity permits the use of a tubular filter that is larger than the core of the coaxial cable (or waveguide) that can be used to provide the radiation to the cavity. For example, FIG. 11 shows a simplified cross-sectional view of illustrative plasma-assisted gas production apparatus 400 consistent with this invention. Like apparatus 300, apparatus 400 can include cavity 405, filter 410, coaxial waveguide 415, tapered waveguide 420, and radiation-transmissive barrier 425. As mentioned above, filter 410 can have nearly any shape, but preferably has a large surface area to increase the rate at which gas is extracted from the plasma. For example, if filter 410 is an elongated tube, it can have a substantially larger diameter than the core of coaxial cable 417. Also, as shown in FIG. 11, filter 410 need not be connected or otherwise shaped to conform with core 417. Finally, a filter consistent with this invention can include multiple filters, which may be disposed on multiple tubes or form the tubes themselves.

Figure 12:
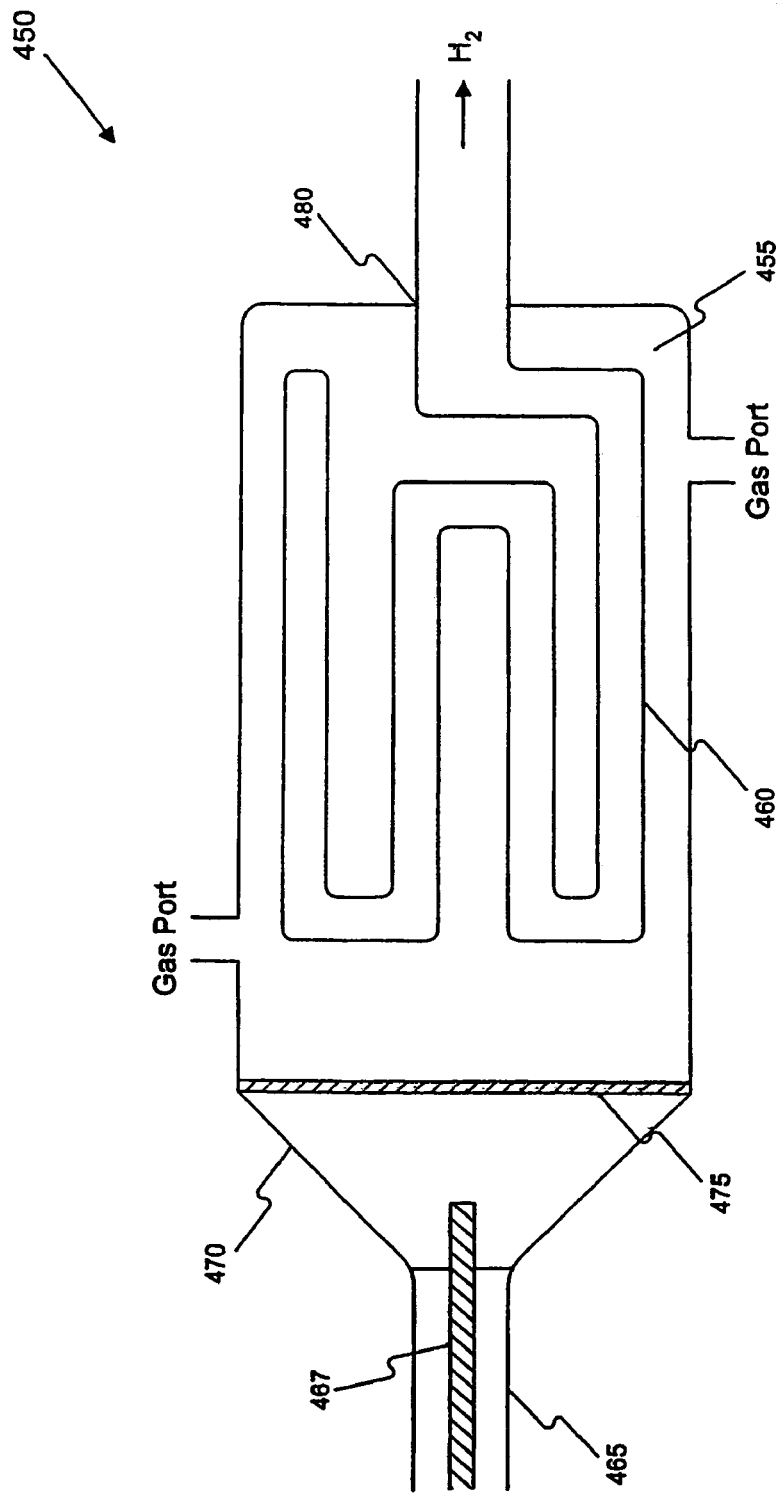
FIG. 12 shows a simplified cross-sectional view of still another illustrative gas production apparatus consistent with this invention.

FIG. 12 shows another simplified cross-sectional view of illustrative gas production apparatus 450 consistent with this invention. Apparatus 450 can include cavity 455, filter 460, coaxial waveguide 465, tapered waveguide 470, and radiation-transmissive barrier 475. Again, filter 460 can have nearly any shape, but preferably has a large surface area to increase the rate at which gas is extracted from the plasma formed in cavity 455. As shown in FIG. 12, filter 460 can include multiple filter components to maximize surface area, and those components can be connected (as shown) or disconnected. If connected, a single gas outlet 480 can be used to collect the gas produced by all of the components. If disconnected, multiple gas outlets can be used to separately collect the gas from each of the components (not shown).

Figure 13:
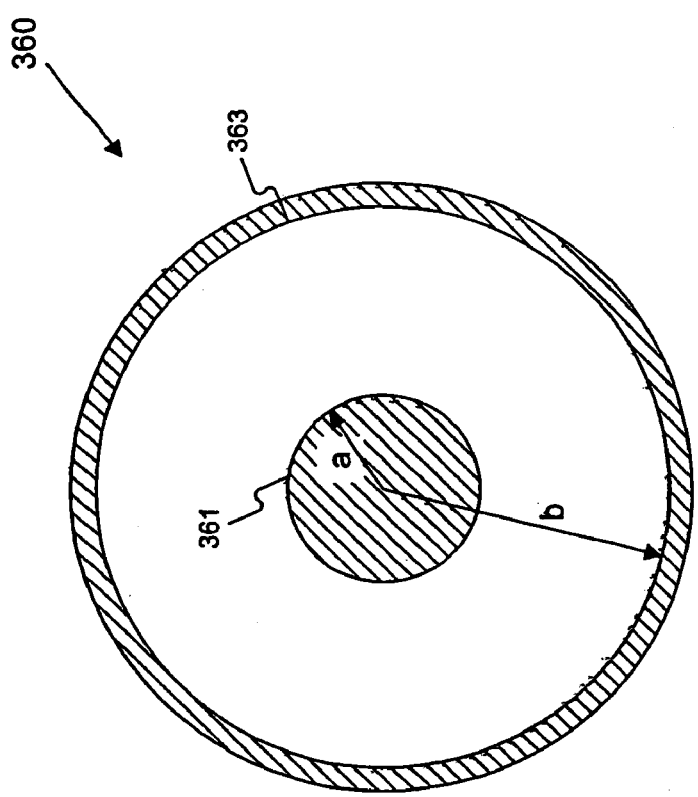
FIG. 13 shows a cross-sectional view of an illustrative coaxial cable (similar to a coaxial waveguide), taken along line 13-13 of FIG. 10, consistent with this invention.

FIG. 13 shows a cross-sectional view of illustrative coaxial cable 360, taken along line 13-13 of FIG. 10. As shown in FIG. 13, core 361 has an outer radius designated by the letter "a" and outer shield 363 has an inner radius designated by the letter "b." When the ratio b:a is between about 2.5:1 and about 3.0:1, the maximum electric field for a given radiation power that occurs at the outer surface of core 361 can be reduced. When the ratio is about 2.72:1, the maximum electric field at that surface can be minimized. The same geometry ratio also holds true for a tubular plasma cavity, which can be defined by an outer radius of an inner filter tube (e.g., filter 315 of FIG. 10) and an inner radius of outer tube (e.g., tube 350 of FIG. 10), or by the outer radius of an inner tube and an inner radius of outer filter tube (not shown). By minimizing the electric field at the filter surface, it is possible to substantially prevent arcing and overheating at the outer surface of filter 315, even when a relatively long filter is used with a relatively large amount of radiation power.

The tubular coaxial geometry of apparatus 300 permits a TEM mode of operation. It will be appreciated, however, that various other geometries (e.g., rectangular) will permit various other modes of operation as well, including single and multi-modes of operation.

Apparatus 300 can also include a voltage source configured to apply a bias to a filter. For example, as shown in FIG. 10, voltage source 320 can apply an electric bias to filter 315 via coaxial cable 325. In this case, inner cable 330 of cable 325 can be electrically connected to filter 315 via electrically conductive tube 335. Tube 335 can be made from any material capable of transporting the atomic or molecular species after passing from filter 315, including, for example, steel or copper. Outer shield 340 of cable 325 can be electrically connected to outer chamber 350, and optionally grounded. Alternatively, voltage source 320 can apply an electric bias to filter 315 via core 361 of coaxial cable 360 when the core is electrically connected to filer 315. Outer shield 363 of cable 360 can also be electrically connected to outer chamber 350, and optionally grounded, if desired.

It will be appreciated that electrical isolator 390<e.g., ceramic or quartz) can be located along steel tube 395 to prevent electrification of outer tube 350. Also, barrier 364 can be radiation-transmissive or opaque, depending on the design requirements. Like barrier 362, barrier 364 can be used to substantially confine plasma 310 in a region proximate to filter 315. It will be appreciated by those of ordinary skill in the art, however, that barrier 364 and isolator 390 can be eliminated, especially when voltage source 320 is not used.

Figure 14:
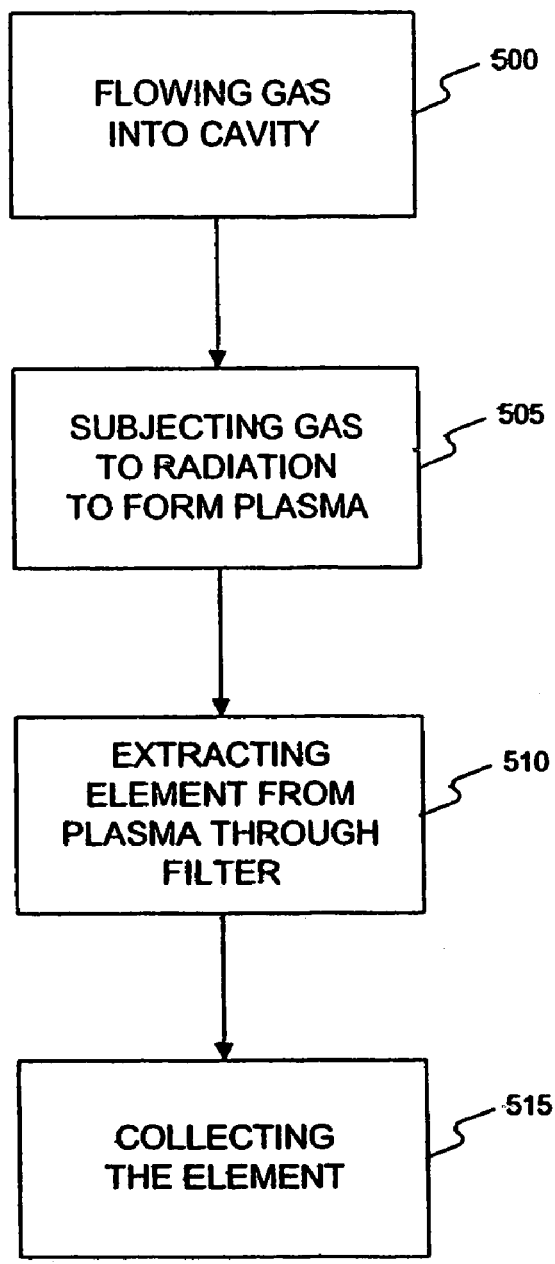
FIG. 14 shows a flow chart of an illustrative gas production method consistent with this invention.

FIG. 14 shows an illustrative gas production method consistent with this invention. The method can include: (1) flowing a gas into a cavity in step 500, (2) subjecting the gas to electromagnetic radiation having a frequency less than about 333 GHz such that a plasma forms in the cavity in step 505, wherein the cavity is in fluid communication with at least one filter, (3)-extracting a first species from the plasma through a filter in step 510, and (4) collecting the species in step 515.

In one embodiment consistent with this invention, step 505 can include igniting the plasma in the cavity by subjecting the gas to the radiation in the presence of at least one plasma catalyst. As explained in detail above, a plasma catalyst can be active or passive, or it can be any other device capable of igniting, modulating, or sustaining a plasma. The use of a plasma catalyst consistent with this invention enables the method of FIG. 14 to be performed below, at, or above atmospheric pressure.

Higher gas pressures can allow for higher plasma pressures, which can be used to increase the rate of extraction and collection. For example, when a pressure gradient is formed across a filter such that the plasma-facing surface (e.g., surface 317 of filter 315) is at a higher pressure than the opposing surface (e.g., surface 319 of filter 315), the selected atomic or molecular species can be extracted at a faster rate. Thus, the use of a plasma catalyst can be used to ignite plasmas at higher pressures, enabling larger gradients to form without vacuum equipment. The use of vacuum equipment on the side of the opposing surface can also be used to increase the magnitude of the pressure gradient, especially during ignition.

Another way to increase the extraction rate is to apply an electric bias to the filter, such as shown in FIG. 10. Although the invention is not necessarily limited to any particular theory, the applied bias can be used to accelerate, and concentrate, the plasma closer the plasma-facing surface of the filter. Higher concentrations may increase the absorption rate at that surface, which in turn can increase the rate at which gas is produced on the other side.

The rate of extraction can depend on the temperature of the filter. If the filter extracts faster at higher temperatures, then the temperature can be increased by exposure to the plasma. Using appropriate temperature control, the temperature can be maintained at an optimum temperature, which may be the highest temperature that the filter can withstand. As used herein, this temperature is referred to as a transition temperature, which could, for example, be the melting or breakdown temperature of the filter. When palladium is used, the temperature can be maintained at about 400 degrees Celsius, but, in general, between about 100 degrees Celsius and about 1,500 degrees Celsius.

The temperature of the filter can be cooled using any conventional cooling technique, including, for example, flowing a fluid through channels embedded or attached to the filter. Another way to cool the filter is to pass a fluid, such as water, through the center of the axial filter 315. In this way, the fluid can be used to cool filter 315 and simultaneously absorb hydrogen gas that has passed through filter 315. The hydrogen gas could then be removed from the fluid in a subsequent step. It will be appreciated that a fluid need not pass through the core of an axial filter. Rather, the fluid could pass over the outer surface of the filter or, as mentioned above, through channels embedded in the filter.

Once gas is being extracted through a filter, it can be collected consistent with this invention. Collection can involve, for example, pumping the first species into a gas container. Alternatively, collection can involve exposing the gas to (e.g., an active area of) a fuel cell. Such a fuel cell may form part of a residential or industrial power supply or it may be located on a vehicle, such as an automobile, a train, a plane, a motorcycle, or any other device that needs mobile power.

A filter surface can also be cleaned consistent with this invention by supplying a cleaning gas to the cavity, forming a cleaning plasma with the cleaning gas, and applying an electric bias to the filter such that charged particles forming the plasma are accelerated toward the filter sufficiently to at least partially remove any residue that may have deposited on the filter.

In the foregoing described embodiments, various features are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description of Embodiments, with each claim standing on its own as a separate preferred embodiment of the invention.

We claim:

1. A plasma assisted gas production method comprising:
   flowing a gas into a main cavity, wherein the gas comprises at least a first species;
   subjecting the gas to electromagnetic radiation having a frequency less than about 333 GHz such that a plasma forms in the cavity, and wherein the cavity is in fluid communication with at least one filter;
   extracting the first species through the filter; and
   collecting the first species.

2. The method of claim 1, wherein the first species compries hydrogen.

3. The method of claim 1, wherein the subjecting comprises igniting the plasma by subjecting the gas in the cavity to the radiation in the presence of at least one plasma catalyst comprising a material that is at least electrically semi-conductive.

4. The method of claim 3, wherein the material comprises at least one of metal, inorganic material, carbon, carbon-based alloy, carbon-based composite, electrically conductive polymer, conductive silicone elastomer, polymer nanocomposite, and organic-inorganic composite.

5. The method of claim 4, wherein the material is in the form of at least one of a nano-particle, a nano-tube, a powder, a dust, a flake, a fiber, a sheet, a needle, a thread, a strand, a filament, a yarn, a twine, a shaving, a silver, a chip, a woven fabric, a tape, and a whisker.

6. The method of claim 5, wherein the plasma catalyst comprises carbon fiber.

7. The method of claim 3, wherein the plasma catalyst comprises a powder.

8. The method of claim 1, wherein the subjecting comprises subjecting the gas to the radiation in the presence of an active plasma catalyst comprising at least one ionizing particle.

9. The method of claim 8, wherein the at least one ionizing particle comprises a beam of particles.

10. The method of claim 8, wherein the particle is at least one of an x-ray particle, a gamma ray particle, an alpha particle, a beta particle, a neutron, an electron, an ion, and a proton.

11. The method of claim 8, wherein the ionizing particle comprises a radioactive fission product.

12. The method of claim 1, wherein the subjecting occurs at a gas pressure that is at least atmospheric pressure.

13. The method of claim 1, wherein the filter comprises at least one of metal hydride, palladium, palladium oxide, ruthenium-palladium, palladium-silver, palladium-copper, uranium, magnesium, titanium, lithium-aluminum, lanthanum-nickel-aluminum, zirconium, ceramic, any combination thereof, and any alloy thereof.

14. The method of claim 1, wherein the filter has a plasma-facing surface and an opposing surface, and wherein the extracting comprises forming a pressure gradient across the filter such that the plasma-facing surface is at a higher pressure than the opposing surface.

15. The method of claim 1, wherein the extracting comprises applying an electric bias to the filter.

16. The method of claim 1, wherein the filter has a transition temperature, and wherein the extracting comprises maintaining the temperature of the filter at a temperature between about 100 degrees Celsius and about 1500 degrees Celsius.

17. The method of claim 16, wherein the extracting comprises allowing the plasma to contact the filter to heat the filter to a desirable operating temperature.

18. The method of claim 1, wherein the filter comprises a plurality of filtering layers, and wherein the extracting comprises passing the first species through each of the filtering layers to obtain a high purity of the first species.

19. The method of claim 1, wherein the at least one filter comprises a plurality of filters disposed on a plurality of respective tubes.

20. The method of claim 1, wherein the filter is disposed on a surface of a tube, and wherein the extracting comprises causing the first species to pass through the filter from a location outside the tube to a location inside the tube.

21. The method of claim 1, wherein the main cavity is formed between an inner filtering tube and a metallic tube, the inner filtering tube comprising the filter and wherein the extracting comprises causing the first species to pass through the inner tube from a location inside the main cavity to a location inside the inner tube.

22. The method of claim 21, further comprising directing the electromagnetic radiation into the main cavity through a coaxial waveguide.

23. The method of claim 21, wherein the inner tube has an outer diameter and the outer tube has an inner diameter, wherein the ratio of the inner diameter to the outer diameter is between about 2.5 and about 3.0.

24. The method of claim 23, wherein the ratio is about 2.72.

25. The method of claim 21, wherein the radiation comprises a TEM mode, the method further comprising shifting the mode axially by a least about a quarter of a wavelength.

26. The method of claim 21, wherein the main cavity has a first axial end and a second axial end, the method further comprises launching the radiation into the main cavity from at least the first axial end.

27. The method of claim 1, wherein the outer tube comprises a material that substantially transmits the radiation and the inner tube substantially reflects the radiation.

28. The method of claim 1, further comprising applying an electric bias to the filter.

29. The method of claim 1, wherein the first species is in a gaseous from after the extracting, and wherein the collecting comprises pumping the first species into a gas container after the extracting.

30. The method of claim 1, wherein the first species is in a gaseous form after the extracting, and wherein the collecting comprises exposing the first species to a fuel cell.

31. The method of claim 1, further comprising cleaning the filter, wherein the cleaning comprises:
    supplying a cleaning gas to the main cavity;
    forming a cleaning plasma with the cleaning gas, where the cleaning plasma comprises charged particles; and
    applying an electric bias to the filter such that the charged particles are accelerated toward the filter sufficiently to at least partially remove a residue deposited on the filter.

32. The method of claim 1, wherein the collecting comprises flowing a fluid in contact with the filter such that the species is absorbed by the fluid.

33. A plasma-assisted gas production apparatus comprising:
    a cavity configured such that a plasma can form therein by subjecting a gas to electromagnetic radiation having a frequency less than about 333 GHz;
    at least one filter associated with the cavity having a plasma-facing side and a plasma-opposing side, wherein the at least one filter is configured to selectively permit a first species, and substantially prevents any other species, present in the plasma to pass through the at least one filter;
    a gas source connected to the cavity for supplying the gas to the cavity;
    a radiation source connected to the cavity for supplying the radiation to the cavity; and
    a collection device in communication with the plasma-opposing side of the at least one filter.

34. The apparatus of claim 33, wherein the gas comprises hydrogen.

35. The apparatus of claim 33, further comprising at least one plasma catalyst in the first cavity, wherein the at least one catalyst comprise a material that is at least electrically semi-conductive.

36. The apparatus of claim 35, wherein the material comprises at least one of metal, inorganic material, carbon, carbon-based alloy, carbon-based composite, electrically conductive polymer, conductive silicone elastomer, polymer nanocomposite, and organic-inorganic composite.

37. The apparatus of claim 36, wherein the material is in the form of at least one of a nano-particle, a nano-tube, a powder, a dust, a flake, a fiber, a sheet, a needle, a thread, a strand, a filament, a yarn, a twine, a shaving, a silver, a chip, a woven fabric, a tape, and a whisker.

38. The apparatus of claim 37, wherein the plasma catalyst comprises carbon fiber.

39. The apparatus of claim 38, wherein the plasma catalyst comprises a powder.

40. The apparatus of claim 33, further comprising an active plasma catalyst comprising at least one ionizing particle in the cavity.

41. The apparatus of claim 40, wherein the at least one ionizing particle comprises a beam of particles.

42. The apparatus of claim 40, wherein the at least one ionizing particle is at least one of an x-ray particle, a gamma ray particle, an alpha particle, a beta particle, a neutron, an electron, an ion, and a proton.

43. The apparatus of claim 33, further comprising an ignition cavity for igniting a plasma with the electromagnetic radiation such that an ignition plasma is formed therein, wherein the ignition cavity is in fluid communication with the first cavity, such that the ignition plasma causes a first plasma to form in the first cavity.

44. The apparatus of claim 33, wherein the filter comprises at least one of metal hydride, palladium, palladium oxide, ruthenium-palladium, palladium-silver, palladium-copper, uranium, magnesium, titanium, lithium-aluminum, lanthanum-nickel-aluminum, zirconium, ceramic, any combination thereof, and any alloy thereof.

45. The apparatus of claim 33, further comprising a voltage source electrically connected to the filter for applying a bias to the filter.

46. The apparatus of claim 33, wherein the filter comprises a plurality of filtering layers.

47. The apparatus of claim 33, wherein the gas collection device at least includes a hydrogen fuel cell.

48. The apparatus of claim 33 wherein the cavity is formed between an inner filtering tube and an outer metallic tube, the inner filtering tube comprising the filter.

49. The apparatus of claim 48, further comprising a coaxial waveguide configured to direct the electromagnetic radiation into the cavity.

50. The apparatus of claim 48, wherein the inner tube has an outer diameter and the outer tube has an inner diameter, wherein the ratio of the inner diameter to the outer diameter is between about 2.5 and about 3.0.

51. The apparatus of claim 50, wherein the ratio is about 2.72.

52. The apparatus of claim 48, wherein the radiation comprises a TEM mode, and wherein the apparatus further comprises an electrically conductive endplate configured to at least shift the mode axially by an odd number of quarter wavelengths.

53. The apparatus of claim 48, wherein the outer tube comprises a material that substantially transmits the radiation.

54. The apparatus of claim 48, wherein the main cavity has a first axial end that is configured to receive the radiation.

55. The apparatus of claim 48, further comprising a voltage source configured to apply a bias to the filter.

56. The apparatus of claim 33, further comprising a channel configured to flow a fluid such that the fluid is in contact with the filter.

57. The apparatus of claim 56, wherein the channel is formed in the filter.

* * * * *

UNITED STATES PATENT AND TRADEMARK OFFICE
CERTIFICATE OF CORRECTION

PATENT NO.           : 7,497,922 B2                                    Page 1 of 1
APPLICATION NO. : 10/513220
DATED                  : March 3, 2009
INVENTOR(S)        : Satyendra Kumar et al.

It is certified that error appears in the above-identified patent and that said Letters Patent is hereby corrected as shown below:

Column 2, line 66, "10/13,393" should read --10/513,393--;

Column 4, line 36, "flower" should read --Power--;

Column 5, line 15, "load-ump" should read --load-dump--;

Column 10, line 54, "mufti-" should read --multi- --;

Column 14, line 49, "Mufti-" should read --Multi- --;

Column 16, line 37, "<e.g.," should read --(e.g.,--;

Column 16, line 52, "(3) -" should read --(3)--;

Column 18, line 62, claim 16, "1500" should read --1,500--;

Column 19, line 37, claim 29, "from" should read --form--; and

Column 20, line 19, claim 37, "silver" should read --sliver--.

Signed and Sealed this

Fourteenth Day of July, 2009

JOHN DOLL
*Acting Director of the United States Patent and Trademark Office*